(12) United States Patent
Voorheis et al.

(10) Patent No.: US 12,099,140 B2
(45) Date of Patent: *Sep. 24, 2024

(54) SYSTEMS AND METHODS FOR INTELLIGENTLY CALIBRATING INFRASTRUCTURE DEVICES USING ONBOARD SENSORS OF AN AUTONOMOUS AGENT

(71) Applicant: May Mobility, Inc., Ann Arbor, MI (US)

(72) Inventors: Tom Voorheis, Ann Arbor, MI (US); Rob Goeddel, Ann Arbor, MI (US); Steve Vozar, Ann Arbor, MI (US); Edwin Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,858

(22) Filed: Nov. 8, 2022

(65) Prior Publication Data
US 2023/0059510 A1    Feb. 23, 2023

Related U.S. Application Data

(63) Continuation of application No. 17/011,037, filed on Sep. 3, 2020, now Pat. No. 11,525,887, which is a
(Continued)

(51) Int. Cl.
*G05D 1/00* (2024.01)
*B60R 11/04* (2006.01)
(Continued)

(52) U.S. Cl.
CPC .............. *G01S 7/40* (2013.01); *B60R 11/04* (2013.01); *G01S 7/497* (2013.01); *G01S 13/865* (2013.01);
(Continued)

(58) Field of Classification Search
CPC .......... G01S 7/40; G01S 7/497; G01S 13/865; G01S 13/867; G01S 13/931;
(Continued)

(56) References Cited

U.S. PATENT DOCUMENTS

| | | | |
|---|---|---|---|
| 5,544,282 A | 8/1996 | Chen et al. | |
| 6,199,013 B1 | 3/2001 | Oshea | |

(Continued)

FOREIGN PATENT DOCUMENTS

| | | | |
|---|---|---|---|
| JP | 2011100492 A | 5/2011 | |
| JP | 2015083417 A | 4/2015 | |

(Continued)

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).

(Continued)

*Primary Examiner* — Mohamed Charioui
*Assistant Examiner* — Dacthang P Ngo
(74) *Attorney, Agent, or Firm* — Jeffrey Schox; Diana Lin

(57) ABSTRACT

A system for intelligently implementing an autonomous agent that includes an autonomous agent, a plurality of infrastructure devices, and a communication interface. A method for intelligently calibrating infrastructure (sensing) devices using onboard sensors of an autonomous agent includes identifying a state of calibration of an infrastructure device, collecting observation data from one or more data sources, identifying or selecting mutually optimal observation data, specifically localizing a subject autonomous agent based on granular mutually optimal observation data, iden-
(Continued)

tifying dissonance in observation data from a perspective of a subject infrastructure device, and recalibrating a subject infrastructure device.

20 Claims, 8 Drawing Sheets

Related U.S. Application Data continuation of application No. 16/792,780, filed on Feb. 17, 2020, now Pat. No. 10,969,470.

(60) Provisional application No. 62/806,564, filed on Feb. 15, 2019.

(51) Int. Cl.
| | | |
|---|---|---|
| G01S 7/40 | (2006.01) | |
| G01S 7/497 | (2006.01) | |
| G01S 13/86 | (2006.01) | |
| G01S 13/931 | (2020.01) | |
| G01S 17/931 | (2020.01) | |
| G02B 7/40 | (2021.01) | |

(52) U.S. Cl.
CPC .......... *G01S 13/867* (2013.01); *G01S 13/931* (2013.01); *G01S 17/931* (2020.01); *G02B 7/40* (2013.01); *G05D 1/0088* (2013.01)

(58) Field of Classification Search
CPC ......... G01S 17/931; B60R 11/04; G02B 7/40; G05D 1/0088; G05D 2201/0213
See application file for complete search history.

(56) References Cited

U.S. PATENT DOCUMENTS

| | | | |
|---|---|---|---|
| 9,129,519 B2 | 9/2015 | Aoude et al. | |
| 9,274,525 B1 | 3/2016 | Ferguson et al. | |
| 9,368,026 B1 | 6/2016 | Herbach et al. | |
| 9,495,874 B1 | 11/2016 | Zhu et al. | |
| 9,618,938 B2 | 4/2017 | Olson et al. | |
| 9,646,428 B1 | 5/2017 | Konrardy et al. | |
| 9,720,412 B1 | 8/2017 | Zhu et al. | |
| 9,811,760 B2 | 11/2017 | Richardson et al. | |
| 9,914,452 B1 | 3/2018 | Ferguson et al. | |
| 10,012,981 B2 | 7/2018 | Gariepy et al. | |
| 10,062,294 B2 | 8/2018 | Kunzi et al. | |
| 10,156,848 B1 | 12/2018 | Konrardy et al. | |
| 10,235,882 B1 | 3/2019 | Aoude et al. | |
| 10,248,120 B1 | 4/2019 | Siegel et al. | |
| 10,386,856 B2 | 8/2019 | Wood et al. | |
| 10,467,891 B1 | 11/2019 | Bart et al. | |
| 10,518,770 B2 | 12/2019 | Kroop et al. | |
| 10,518,783 B2 | 12/2019 | Tanimichi et al. | |
| 10,540,892 B1 | 1/2020 | Fields et al. | |
| 10,558,224 B1 | 2/2020 | Lin et al. | |
| 10,564,641 B2 | 2/2020 | Vozar et al. | |
| 10,564,643 B2 | 2/2020 | Lui et al. | |
| 10,571,916 B2 | 2/2020 | Tschanz et al. | |
| 10,586,254 B2 | 3/2020 | Singhal | |
| 10,599,155 B1 | 3/2020 | Konrardy et al. | |
| 10,614,709 B2 | 4/2020 | Vozar et al. | |
| 10,642,276 B2 | 5/2020 | Huai | |
| 10,654,476 B2 | 5/2020 | Wray et al. | |
| 10,671,076 B1 | 6/2020 | Kobilarov et al. | |
| 10,796,581 B2 | 10/2020 | Herbach et al. | |
| 10,860,019 B2 | 12/2020 | Censi et al. | |
| 10,969,470 B2 * | 4/2021 | Voorheis | G01S 13/867 |
| 11,086,318 B1 | 8/2021 | Davis et al. | |
| 11,087,200 B2 | 8/2021 | Olson et al. | |
| 11,242,054 B2 | 2/2022 | Isele | |
| 11,260,855 B2 | 3/2022 | Zhang | |
| 11,281,213 B2 | 3/2022 | Cross et al. | |
| 11,300,957 B2 | 4/2022 | Wray et al. | |
| 11,396,302 B2 | 7/2022 | Ye et al. | |
| 11,525,887 B2 * | 12/2022 | Voorheis | G02B 7/40 |
| 2002/0062207 A1 | 5/2002 | Faghri | |
| 2004/0100563 A1 | 5/2004 | Sablak et al. | |
| 2005/0004723 A1 | 1/2005 | Duggan et al. | |
| 2006/0184275 A1 | 8/2006 | Hosokawa et al. | |
| 2006/0200333 A1 | 9/2006 | Dalal et al. | |
| 2007/0193798 A1 | 8/2007 | Allard et al. | |
| 2007/0276600 A1 | 11/2007 | King et al. | |
| 2008/0033684 A1 | 2/2008 | Vian et al. | |
| 2010/0114554 A1 | 5/2010 | Misra | |
| 2011/0142283 A1 | 6/2011 | Huang et al. | |
| 2012/0089275 A1 | 4/2012 | Yao-Chang et al. | |
| 2013/0054106 A1 | 2/2013 | Schmuedderich et al. | |
| 2013/0141576 A1 | 6/2013 | Lord et al. | |
| 2013/0253816 A1 | 9/2013 | Caminiti et al. | |
| 2014/0195138 A1 | 7/2014 | Stelzig et al. | |
| 2014/0244198 A1 | 8/2014 | Mayer | |
| 2014/0309815 A1 | 10/2014 | Ricci et al. | |
| 2015/0105961 A1 | 4/2015 | Callow | |
| 2015/0284010 A1 | 10/2015 | Beardsley et al. | |
| 2015/0302756 A1 | 10/2015 | Guehring et al. | |
| 2015/0316928 A1 | 11/2015 | Guehring et al. | |
| 2015/0321337 A1 | 11/2015 | Stephens | |
| 2015/0344030 A1 | 12/2015 | Damerow et al. | |
| 2016/0005333 A1 | 1/2016 | Naouri | |
| 2016/0209840 A1 | 7/2016 | Kim | |
| 2016/0314224 A1 | 10/2016 | Wei et al. | |
| 2017/0031361 A1 | 2/2017 | Olson et al. | |
| 2017/0032671 A1 | 2/2017 | Toyama et al. | |
| 2017/0072853 A1 | 3/2017 | Matsuoka et al. | |
| 2017/0155696 A1 | 6/2017 | Dong et al. | |
| 2017/0199523 A1 | 7/2017 | Barton-Sweeney et al. | |
| 2017/0248952 A1 | 8/2017 | Perkins et al. | |
| 2017/0268896 A1 | 9/2017 | Bai et al. | |
| 2017/0289341 A1 | 10/2017 | Rodriguez et al. | |
| 2017/0291560 A1 | 10/2017 | Schroeder et al. | |
| 2017/0301111 A1 | 10/2017 | Zhao et al. | |
| 2017/0320500 A1 | 11/2017 | Yoo et al. | |
| 2017/0323568 A1 | 11/2017 | Inoue et al. | |
| 2017/0356748 A1 | 12/2017 | Iagnemma | |
| 2018/0011485 A1 | 1/2018 | Ferren | |
| 2018/0018895 A1 | 1/2018 | Chan et al. | |
| 2018/0046182 A1 | 2/2018 | Joyce et al. | |
| 2018/0047291 A1 | 2/2018 | Konishi et al. | |
| 2018/0053102 A1 | 2/2018 | Martinson et al. | |
| 2018/0065625 A1 | 3/2018 | Tijerina et al. | |
| 2018/0070056 A1 | 3/2018 | Deangelis et al. | |
| 2018/0082596 A1 | 3/2018 | Whitlow | |
| 2018/0089563 A1 | 3/2018 | Redding et al. | |
| 2018/0100743 A1 | 4/2018 | Diaz et al. | |
| 2018/0183873 A1 | 6/2018 | Wang et al. | |
| 2018/0184352 A1 | 6/2018 | Lopes et al. | |
| 2018/0196427 A1 | 7/2018 | Majumdar et al. | |
| 2018/0220283 A1 | 8/2018 | Condeixa et al. | |
| 2018/0224851 A1 | 8/2018 | Park | |
| 2018/0251126 A1 | 9/2018 | Linscott et al. | |
| 2018/0267550 A1 | 9/2018 | Kopetz et al. | |
| 2018/0268281 A1 | 9/2018 | Olson et al. | |
| 2018/0293537 A1 | 10/2018 | Kwok | |
| 2018/0299898 A1 | 10/2018 | Luo et al. | |
| 2018/0330481 A1 | 11/2018 | Watanabe et al. | |
| 2018/0365908 A1 | 12/2018 | Liu et al. | |
| 2018/0367997 A1 | 12/2018 | Shaw et al. | |
| 2019/0027034 A1 | 1/2019 | Xu et al. | |
| 2019/0039545 A1 | 2/2019 | Kumar et al. | |
| 2019/0066399 A1 | 2/2019 | Jiang et al. | |
| 2019/0096244 A1 | 3/2019 | Guruva Reddiar et al. | |
| 2019/0101914 A1 | 4/2019 | Coleman et al. | |
| 2019/0101919 A1 | 4/2019 | Kobilarov et al. | |
| 2019/0106117 A1 | 4/2019 | Goldberg | |
| 2019/0113919 A1 | 4/2019 | Englard et al. | |
| 2019/0113929 A1 | 4/2019 | Mukadam et al. | |
| 2019/0130878 A1 | 5/2019 | Bradley | |
| 2019/0138524 A1 | 5/2019 | Singh et al. | |
| 2019/0147610 A1 | 5/2019 | Frossard et al. | |
| 2019/0180529 A1 | 6/2019 | Smith | |
| 2019/0196465 A1 | 6/2019 | Hummelshøj | |

(56) References Cited

U.S. PATENT DOCUMENTS

| | | |
|---|---|---|
| 2019/0220011 A1 | 7/2019 | Della Penna |
| 2019/0227553 A1 | 7/2019 | Kentley-Klay et al. |
| 2019/0235516 A1 | 8/2019 | Zhang et al. |
| 2019/0236950 A1 | 8/2019 | Li et al. |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271981 A1 | 9/2019 | Oba |
| 2019/0329771 A1 | 10/2019 | Wray et al. |
| 2019/0331758 A1* | 10/2019 | Malkes ............... G01S 7/4004 |
| 2019/0332106 A1 | 10/2019 | Belloni Mourao et al. |
| 2019/0337509 A1 | 11/2019 | Shalev-Shwartz et al. |
| 2020/0017114 A1 | 1/2020 | Santoni et al. |
| 2020/0020226 A1 | 1/2020 | Stenneth et al. |
| 2020/0057441 A1 | 2/2020 | Wang et al. |
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0122830 A1 | 4/2020 | Anderson et al. |
| 2020/0124447 A1 | 4/2020 | Schwindt et al. |
| 2020/0159227 A1 | 5/2020 | Cohen et al. |
| 2020/0189731 A1 | 6/2020 | Mistry et al. |
| 2020/0209853 A1 | 7/2020 | Leach et al. |
| 2020/0209864 A1 | 7/2020 | Chen |
| 2020/0210777 A1* | 7/2020 | Valois ............... B60W 60/0025 |
| 2020/0217668 A1* | 7/2020 | Cionca ............... G01C 21/005 |
| 2020/0233060 A1 | 7/2020 | Lull et al. |
| 2020/0249684 A1* | 8/2020 | Onofrio ............... G05D 1/0223 |
| 2020/0255027 A1 | 8/2020 | Kulkarni et al. |
| 2020/0269843 A1 | 8/2020 | Wissing et al. |
| 2020/0290619 A1 | 9/2020 | Mehdi et al. |
| 2020/0294401 A1 | 9/2020 | Kerecsen |
| 2020/0309543 A1 | 10/2020 | Voznesensky |
| 2020/0339151 A1 | 10/2020 | Batts et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0388159 A1* | 12/2020 | Degerman ............. G08G 1/166 |
| 2020/0400781 A1 | 12/2020 | Voorheis et al. |
| 2021/0042535 A1 | 2/2021 | Abbott et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0197864 A1 | 7/2021 | Oltmann et al. |
| 2021/0208244 A1 | 7/2021 | Voorheis et al. |
| 2021/0229697 A1 | 7/2021 | Lee et al. |
| 2021/0245785 A1 | 8/2021 | Suzuki et al. |
| 2021/0269063 A1 | 9/2021 | Lee et al. |
| 2021/0286651 A1 | 9/2021 | Ho et al. |
| 2021/0339741 A1 | 11/2021 | Rezvan Behbahani et al. |
| 2021/0365701 A1 | 11/2021 | Eshet et al. |
| 2022/0076032 A1 | 3/2022 | Jain et al. |
| 2022/0081005 A1 | 3/2022 | Brown et al. |
| 2022/0126878 A1 | 4/2022 | Moustafa et al. |
| 2022/0185325 A1 | 6/2022 | Chen et al. |
| 2022/0204010 A1 | 6/2022 | Zhu et al. |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |

OTHER PUBLICATIONS

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect Of Pruning On A Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

\* cited by examiner

SYSTEMS AND METHODS FOR INTELLIGENTLY CALIBRATING INFRASTRUCTURE DEVICES USING ONBOARD SENSORS OF AN AUTONOMOUS AGENT

CROSS-REFERENCE TO RELATED APPLICATIONS

This application is a continuation of U.S. application Ser. No. 17/011,037, filed 3 Sep. 2020, which is a continuation of U.S. application Ser. No. 16/792,780, filed 17 Feb. 2020, which claims the benefit of U.S. Provisional Application Ser. No. 62/806,564, filed 15 Feb. 2019, which is incorporated herein in its entirety by this reference.

TECHNICAL FIELD

The inventions relate generally to the vehicle automation field, and more specifically to new and useful systems and methods for intelligently arbitrating modes of operating an autonomous agent in the vehicle automation field.

BACKGROUND

State of the art vehicle automation presently enables some autonomous vehicles to operate in a substantially and/or fully autonomous state. An ability of such autonomous vehicles to operate effectively and safely in busy or active environments often relies on an ability of the autonomous agent to observe its operating environment and make operating decisions that enables the autonomous agent to achieve a routing or traveling goal in a safe manner.

To observe an operating environment, autonomous agents may be configured with many sensors, sources of compute, sources of power and actuators that operate together to enable the autonomous vehicle to perceive and comprehend its environment and further, compute decisions and controls that optimizes how safely that the autonomous vehicle traverses the environment.

A safe operation of some autonomous agents often relies on accurate and calibrated sensors that enable the autonomous agents to intelligently and safely evaluate its environment and driving conditions. However, over time, some characteristic of these sensors may change in terms of position and/or degradation. Accordingly, these sensors may become uncalibrated and therefore, diminish a quality of sensing data provided to the autonomous agent.

Thus, there is a need in the vehicle automation field for systems and methods for intelligently calibrating sensors and, namely, infrastructure sensors that enhanced comprehension of an operating environment by an autonomous agent. The embodiments of the present application described herein provide technical solutions that address, at least, the needs described above.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. Overview

Figure 1:
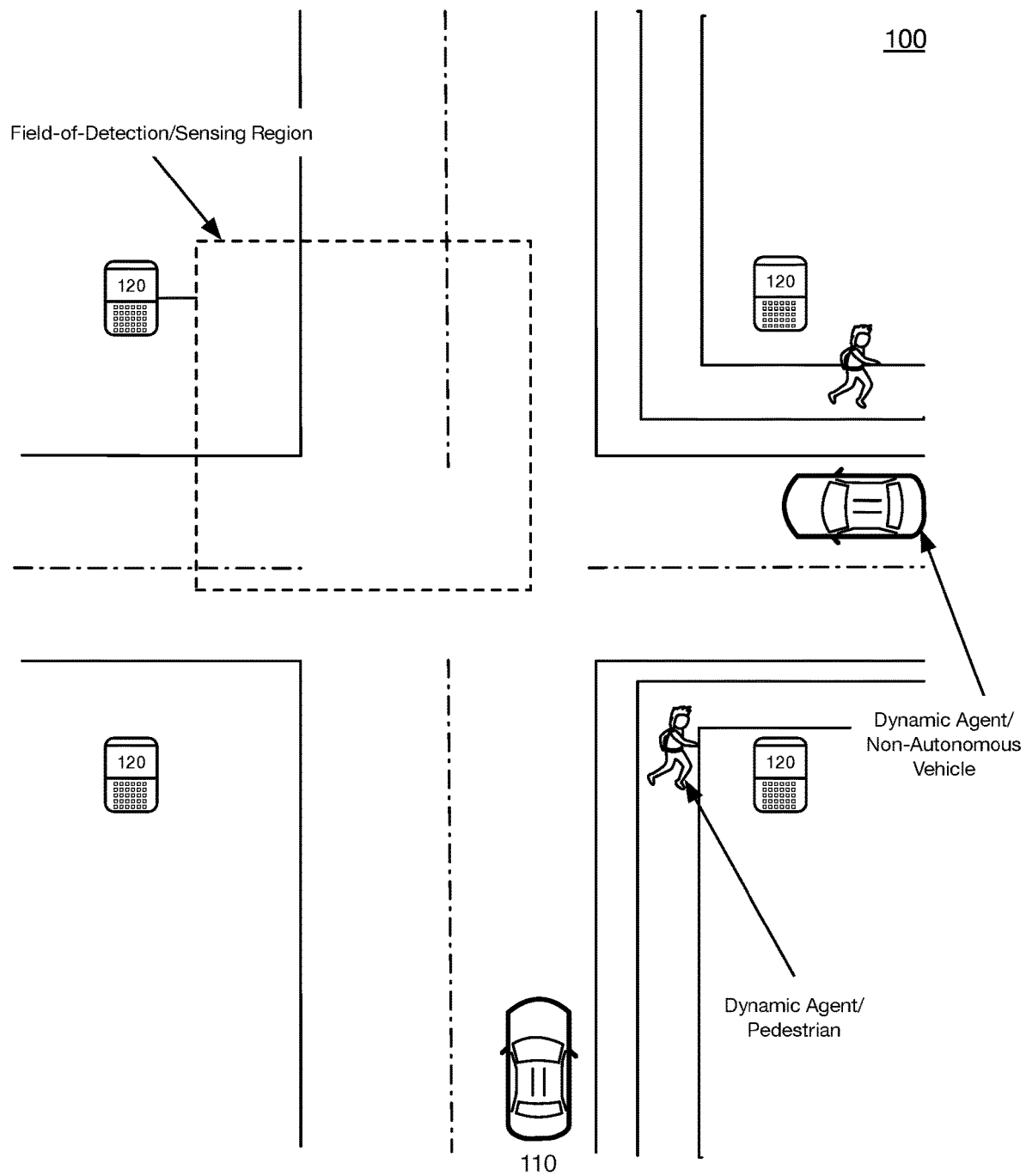
FIG. 1 illustrates a schematic representation of a system for implementing an autonomous agent in accordance with one or more embodiments of the present application.
Figure 2:
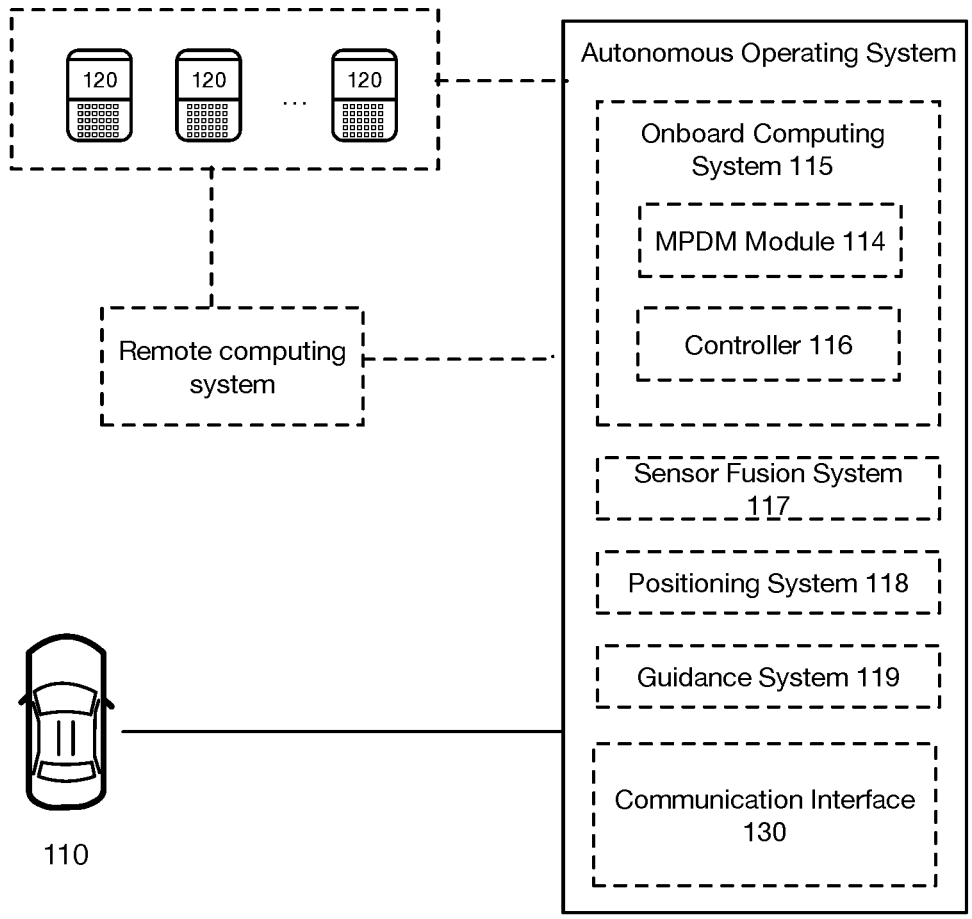
FIG. 2 illustrates an example schematic representation of an autonomous agent operating system in accordance with one or more embodiments of the present application.

As shown in FIGS. 1-2, a system 100 for intelligently implementing an autonomous agent that includes an autonomous agent 110, a plurality of infrastructure devices 120, and a communication interface 130, as described in U.S. Provisional Application Nos. 62/701,014 and 62/718,642, which are both incorporated herein in their entireties by this reference.

Figure 5:
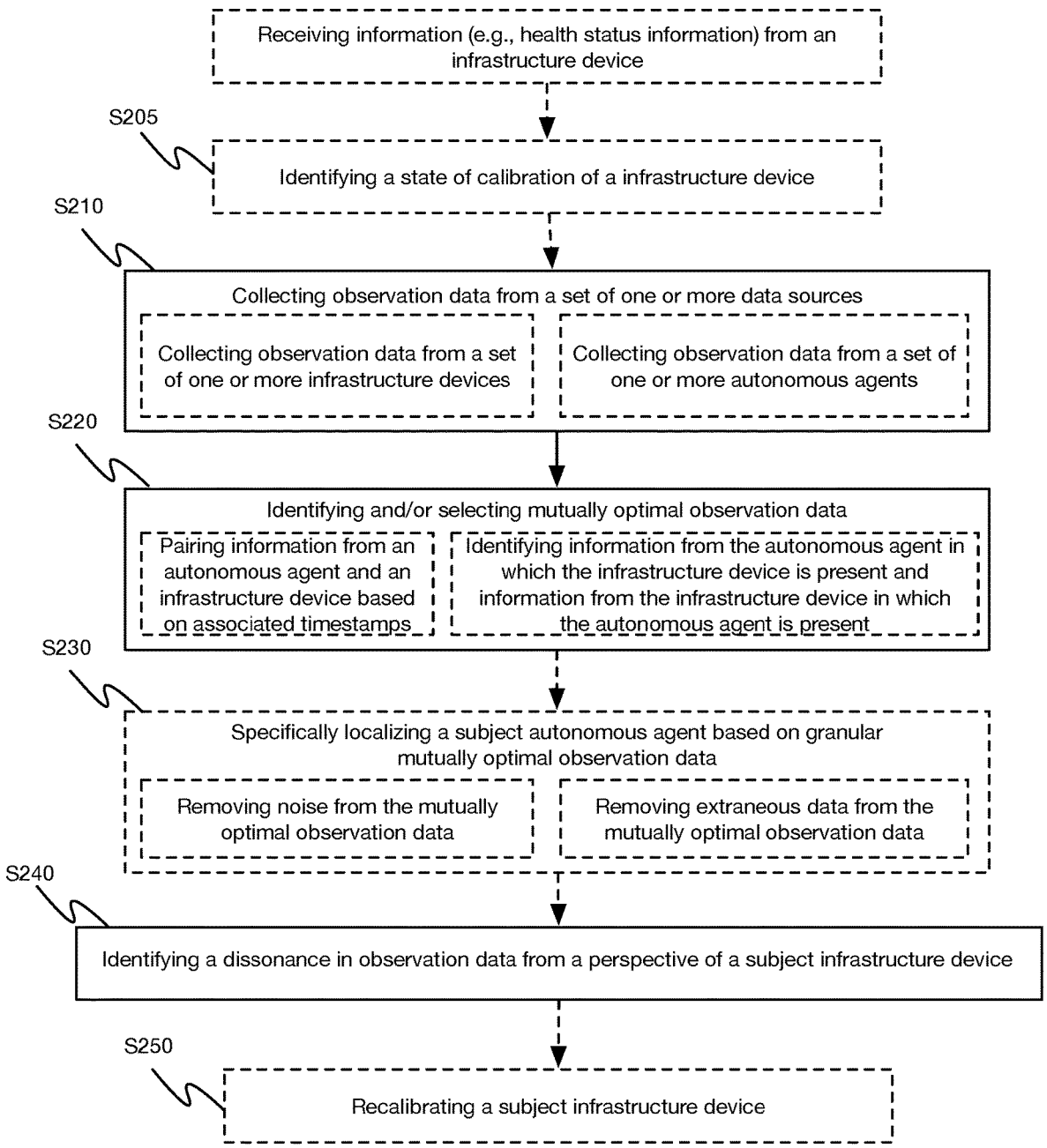
FIG. 5 illustrates a variation of the method 200.

As shown in FIG. 5, a method 200 for intelligently calibrating infrastructure (sensing) devices (e.g., sensors, infrastructure devices, etc.) using onboard sensors of an autonomous agent includes identifying a state of calibration of an infrastructure device S205, collecting observation data from one or more data sources, S210, identifying or selecting mutually optimal observation data S220, specifically localizing a subject autonomous agent based on granular mutually optimal observation data S230, identifying dissonance in observation data from a perspective of a subject infrastructure device S240, and recalibrating a subject infrastructure device S250.

2. Benefits

The system and/or method can confer several benefits over conventional systems and methods.

First, in some variations, the system and/or method confers the benefit of enabling a calibration error associated with an autonomous agent and/or its infrastructure to be identified. In a set of specific examples, for instance, a comparison between observation data collected at a set of sensors of an autonomous agent and observation data collected at a set of sensors of an infrastructure device enables a determination of a calibration error to be made.

Second, in some variations, the system and/or method confers the benefit of enabling a particular type of calibration error (e.g., intrinsic calibration error as described below, extrinsic calibration error as described below, etc.) to be identified. In a set of specific examples, for instance, different types of information or data associated with each potential source of error (e.g., each sensor) are assessed. Health data and observational data, for instance, from each sensor of an infrastructure device can be assessed in an event of a detected calibration error. In another set of specific examples, historical information associated with a set of sensors is used to determine which calibration error is most likely to have occurred. In yet another set of specific examples, the type of calibration error is predicted (e.g., using a set of algorithms, using a deep learning model, etc.).

Third, in some variations, the system and/or method confers the benefit of enabling a particular source (e.g., infrastructure device versus autonomous agent, particular sensor of infrastructure device, particular sensor of autonomous agent, etc.) of calibration error to be identified.

Fourth, in some variations, the system and/or method confers the benefit of enabling a particular time in which a calibration error occurred to be identified.

Fifth, in some variations, the system and/or method confers the benefit of enabling a remote update of a calibration of at least one of an infrastructure device and an autonomous agent. In a set of specific examples, for instance, upon determining a calibration error at a remote computing system, a calibration update is automatically and wirelessly transmitted to an identified source or sources of the calibration error. This can in turn function, for instance, to enable the operation of a self-sufficient set of infrastructure devices, which can augment an autonomous agent's perception of its surroundings.

Sixth, in some variations, the system and/or method confers the benefit of leveraging spatially aware infrastructure devices to maintain an overall calibration of the system. As such, this can additionally function to detect early calibration errors, determine a source of a calibration error (e.g., identify a vehicle calibration error versus an infrastructure device calibration error, identify a particular sensor in need of a calibration update, etc.), and/or perform any other suitable function. This can be advantageous over conventional systems and methods including infrastructure devices, which are not spatially aware but used mainly or solely for communication (e.g., strapped to a traffic light and configured to communicate the color of the traffic light). In specific examples of this variation, the spatial awareness of the infrastructure device enables calibration of the overall system to be performed through detection and localization of the autonomous agent(s) within the data stream of the infrastructure device.

Seventh, in some variations, the system and/or method confers the benefit of leveraging and/or adapting to existing infrastructure for mounting of the infrastructure devices. In specific examples in which the infrastructure devices are mounted at various heights (e.g., to interface with existing infrastructure of different types and/or heights, to conform to local ordinances, to interface with publicly owned poles, etc.), a lens of the infrastructure camera can be chosen in accordance with the height of the camera.

Additionally or alternatively, the system and/or method can confer any other suitable benefits.

1. System for Implementing an Autonomous Agent

Figure 4:
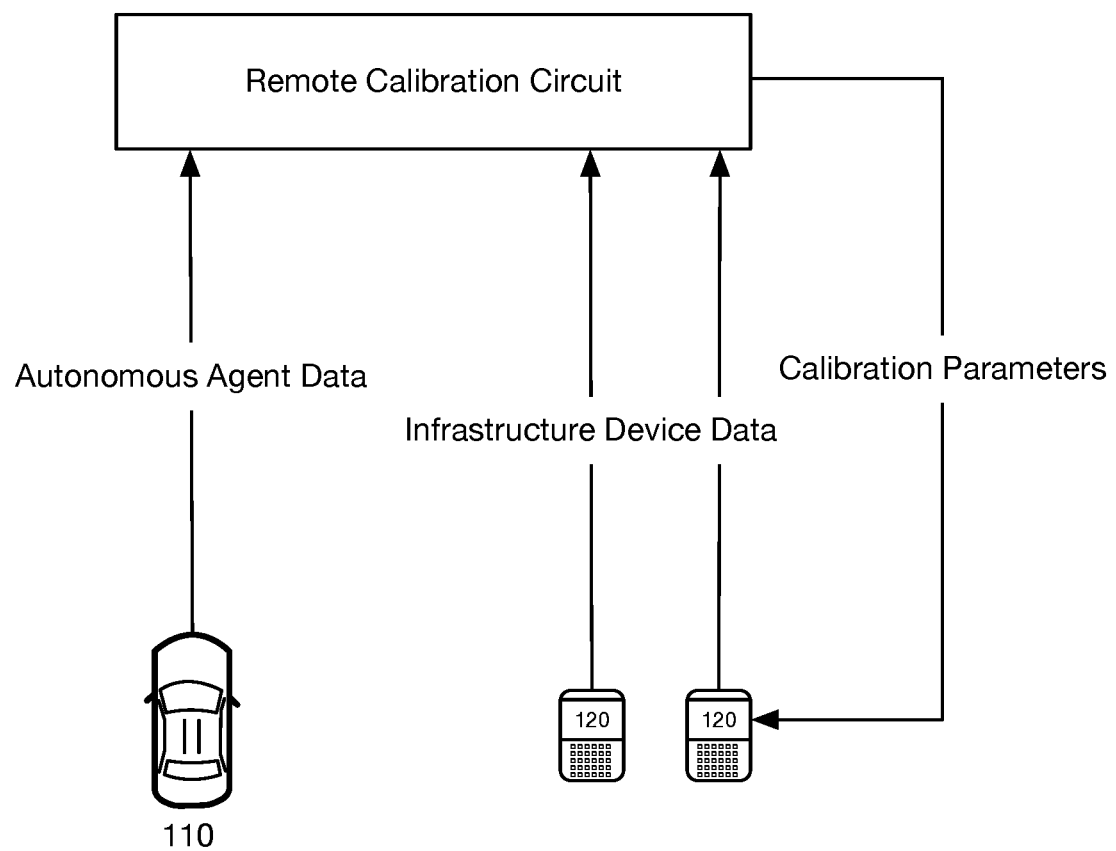
FIG. 4 illustrates an example schematic of a subsystem of the system 100 for identifying uncalibrated infrastructure devices and generating calibration parameters in accordance with one or more embodiments of the present application.

As shown in FIGS. 1-2, a system 100 for intelligently implementing an autonomous agent that includes an autonomous agent 110, a plurality of infrastructure devices 120, and a communication interface 130, as described in U.S. Provisional Application Nos. 62/701,014 and 62/718,642, which are both incorporated herein in their entireties by this reference. As shown in FIG. 4, a subsystem of the system 100 includes a plurality of autonomous health monitors and an autonomous state machine.

The system 100 can additionally or alternatively include any or all of the systems, components, and/or embodiments described in any or all of: U.S. patent application Ser. No. 16/514,624, filed 17 Jul. 2019, U.S. patent application Ser. No. 16/505,372, filed 8 Jul. 2019, and U.S. patent application Ser. No. 16/540,836, filed 14 Aug. 2019, each of which is incorporated herein in its entirety by this reference.

The autonomous agent 110 preferably includes an autonomous vehicle 110 that is preferably a fully autonomous vehicle, but may additionally or alternatively be any semi-autonomous or fully autonomous vehicle; e.g., a boat, an unmanned aerial vehicle, a driverless car, etc. Additionally, or alternatively, the autonomous agent 110 may be a vehicle that switches between a semi-autonomous state and a fully autonomous state (or a fully-manned state) and thus, the autonomous agent 110 may have attributes of both a semi-autonomous vehicle and a fully autonomous vehicle depending on the state of the autonomous agent 110. While some portions of the embodiments of the present application are described herein as being implemented via an autonomous agent 110 (e.g., an autonomous vehicle (e.g., a driverless car), a semi-autonomous, an unmanned aerial vehicle (e.g., a drone), or the like) it shall be noted that any suitable computing device (e.g., any edge device including mobile computing devices, etc.) may be implemented to process sensor data of an autonomous agent 110. While it is generally described that the autonomous agent 110 may be an autonomous vehicle, it shall be noted that the autonomous agent no may be any type of kind of autonomous machine, autonomous device, autonomous robot, and/or the like.

In a preferred embodiment, the autonomous agent no includes an onboard computing system 115 (e.g., a computer integrated with the autonomous agent) or any suitable vehicle system but can additionally or alternatively be decoupled from the autonomous agent 110 (e.g., a user mobile device operating independent of the autonomous agent).

Additionally, or alternatively, the onboard computing system 115 can include a processing system (e.g., graphical processing unit or GPU, central processing unit or CPU, or any suitable processing circuitry) as well as memory. The memory can be short term (e.g., volatile, non-volatile, random access memory or RAM, etc.) and/or long term (e.g., flash memory, hard disk, etc.) memory. As discussed below, the autonomous agent 110 may additionally include a communication interface 130 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay).

Additionally, or alternatively, the autonomous agent no may be in operable communication with a remote or disparate computing system that may include a user device (e.g., a mobile phone, a laptop, etc.), a remote server, a cloud server, or any other suitable local and/or distributed computing system remote from the vehicle. The remote computing system is preferably connected to one or more systems of the autonomous agent through one or more data connections (e.g., channels), but can alternatively communicate with the vehicle system in any suitable manner.

In some variations, information from the infrastructure devices and the autonomous agents is received at a cloud computing system, where processing of the information (e.g., to determine mutually optimal observation data) is performed. Additionally or alternatively, any or all of the processing can be performed at an onboard computing system 115, at processing onboard one or more infrastructure devices, any combination of these locations, and/or at any other suitable location(s).

The onboard computing system 115 preferably functions to control the autonomous agent 110 and process sensed data from a sensor suite (e.g., a computer vision system, LiDAR, flash LiDAR, wheel speed sensors, radar, GPS, etc.) of the autonomous agent 110 and/or other (infrastructure device 120) sensors to determine states of the autonomous agent no and/or states of agents in an operating environment of the autonomous agent no. Based upon the states of the autonomous agent and/or agents in the operating environment and programmed instructions, the onboard computing system 115 preferably modifies or controls behavior of autonomous agent no. Additionally, or alternatively, the onboard computing system 115 preferably includes a multi-policy decision-making module 114 that functions to generate behavioral policies and select a behavioral policy that the onboard computing system 115 may function to execute to control a behavior of the autonomous agent no.

The onboard computing system 115 is preferably a general-purpose computer adapted for I/O communication with vehicle control systems and sensor systems but may additionally or alternatively be any suitable computing device.

Additionally, or alternatively, the onboard computing system 115 is preferably connected to the Internet via a wireless connection (e.g., via a cellular link or connection). Additionally, or alternatively, the onboard computing system 115 may be coupled to any number of wireless or wired communication systems.

The infrastructure devices 120 preferably function to observe one or more aspects and/or features of an environment. In such preferred embodiments, the infrastructure devices additionally function to collect data associated with the observations and transmit the collected data and/or processed derivatives of the collected data to the autonomous agent no and/or a remote computing system. Additionally, or alternatively, each of the infrastructure devices 120 may function to generate health status data based on continuous and/or periodic introspective evaluations of one or more operations, processes, operable features, and the like of the respective infrastructure device 120. The infrastructure devices 120 may function to transmit the health status data separately from and/or along with sensed data (observation data), as described in U.S. Provisional Application No. 62/702,715, which is incorporated herein in its entirety by this reference. In some embodiments, the infrastructure devices 120 may be referred to herein as roadside units. The roadside units preferably include devices in an immediate and/or close proximity to an operating position of an autonomous agent no, such as an autonomous car, and may function to collect data regarding circumstances surrounding the autonomous agent no and in areas proximate to a zone of operation of the autonomous agent 110. In some embodiments, the roadside units may include one or more of offboard sensing devices including flash LiDAR, LiDAR, thermal imaging devices (thermal cameras), still or video capturing devices (e.g., image cameras and/or video cameras, etc.), global positioning systems, radar systems, microwave systems, inertial measuring units (IMUs), and/or the like.

The infrastructure devices 120 may additionally or alternatively include computing capabilities via processing circuitry and a communication interface that enables the infrastructure devices 120 to communicate with an autonomous agent 110.

The infrastructure devices are preferably arranged throughout a set of one or more predetermined routes associated with one or more autonomous agents. Additionally or alternatively, the infrastructure devices can be arranged to cover any suitable route, such as arranged in a grid or grid-like fashion, and/or arranged in any other suitable arrangement.

In some variations, for instance, the infrastructure devices are restricted (e.g., based on local ordinances) and/or desired to be placed on publicly-owned infrastructure, such as publicly-owned utility poles. As such, the spacing between nearest neighbor infrastructure devices may vary among the infrastructure devices, and subsequently the region which the infrastructure devices must monitor can significantly vary in size (and in shape, etc.). Additionally or alternatively, the heights at which the infrastructure devices are mounted may vary among the poles, which can function to avoid obstacles on the poles, work around obstacles in the line of sight, and/or perform any other suitable function(s).

The infrastructure devices are preferably mounted to existing infrastructure, such as any or all of: poles (e.g., utility poles), buildings, traffic lights and/or posts, stop signs or other road signs, sidewalks or roads, and/or any other suitable infrastructure. Additionally or alternatively, the infrastructure devices can be secured to custom components, such as custom infrastructure. Any or all of the infrastructure can be publicly owned, privately owned, or any combination. The infrastructure devices can be arranged such that they are each at a uniform height, such as a predetermined constant height. Additionally or alternatively, any or all of the infrastructure devices can be at various heights, such as to avoid line of sight obstacles.

Figure 8:
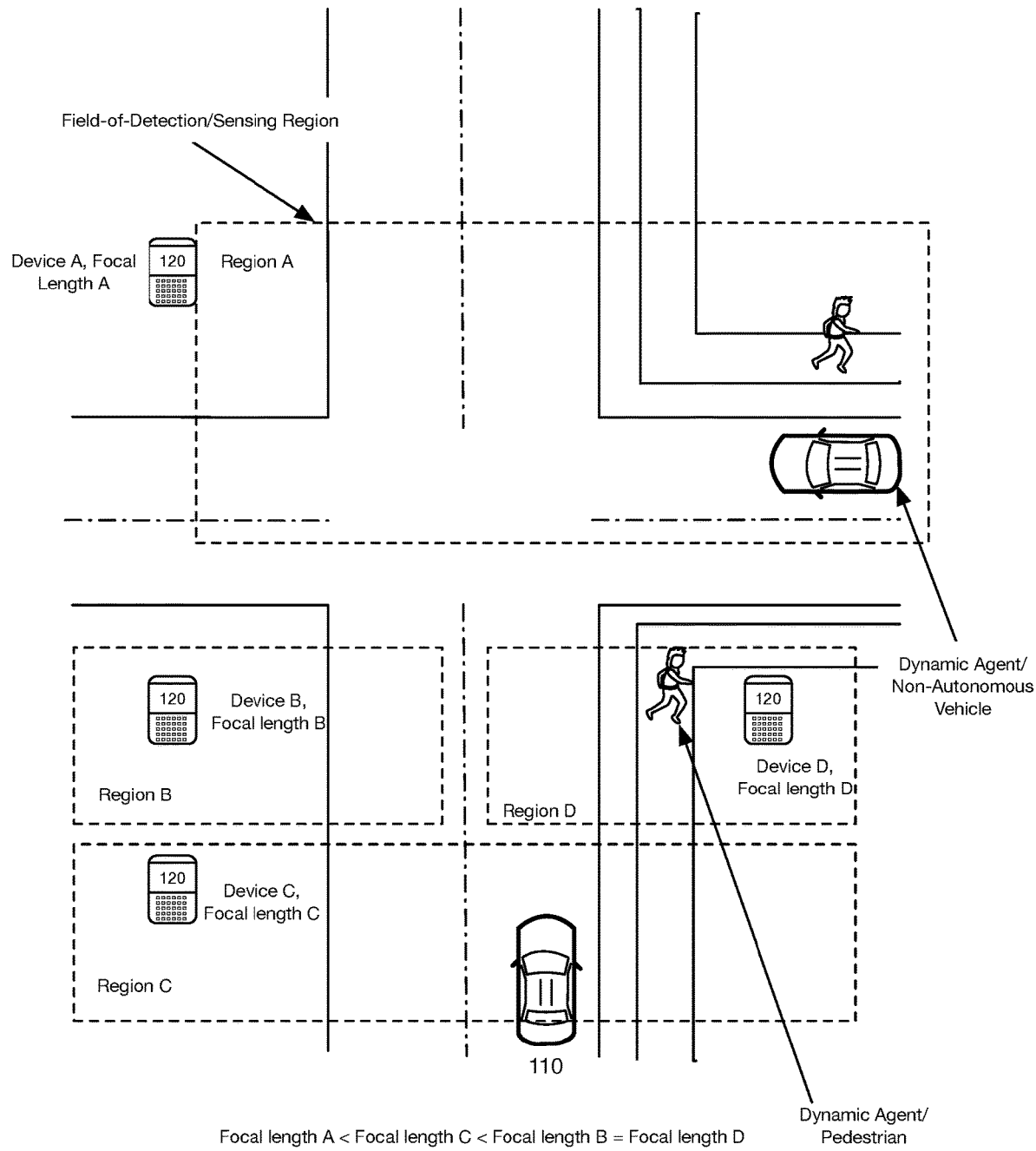
FIG. 8 illustrates a variation of a set of infrastructure devices.

The particular sensor(s) and/or sensor components can optionally be selected based on the spacing among infrastructure devices and/or the height or other parameters associated with the ultimate location of the infrastructure device (e.g., mounted position). In some variations wherein an infrastructure device includes a camera, for instance, the lens and/or focal length of the camera is chosen based on the relative proximity of other infrastructure devices relative to this particular infrastructure device (e.g., as shown in FIG. 8). In a set of specific examples (e.g., when the infrastructure on which the infrastructure devices are mounted is restricted), the lens of the camera for each infrastructure device is chosen based on the size of the region that the camera must detect, which is based on the proximity of the nearest infrastructure devices. For infrastructure devices which must view a large area, a relatively short focal length lens can be chosen whereas for infrastructure devices which can view a small area, a larger focal length can be chosen. Additionally or alternatively, the lens can be adjusted based on a relative importance of the region being monitored (e.g., contains an important intersection, is highly trafficked by pedestrians, etc.). Further additionally or alternatively, any other features of a camera (e.g., resolution, sensor type such as a full frame, etc.) or other infrastructure device sensor (e.g., radar, LiDAR, etc.) can be chosen.

A technical benefit achieved by the implementation of the infrastructure devices 120 includes an ability to observe circumstances (e.g., around corners, down perpendicular streets, etc.) beyond the observable scope of the autonomous agent 110. The autonomous agent 110 may function to augment data derived by its own onboard sensor suite with the additional observations by the infrastructure devices 120 (e.g., the roadside) 120 to improve behavioral policy selection by the autonomous agent 110.

Additionally, or alternatively, in various embodiments the infrastructure devices 120 are able to detect and track any type or kind of agents in an operating environment, such as with a video camera or radar. In such embodiments, an example video camera may function to provide detection of agents and semantic classification of the agent type and possible intent of an agent, such as a pedestrian that is about to cross a road, or a car that is about to make a left turn, a driver which is about to open a car door and exit their vehicle and/or the like.

In a first set of variations of the set of infrastructure devices, each infrastructure device includes a set of one or more cameras, wherein the set of cameras can individually and/or collectively detect an autonomous agent (e.g., coarsely localize, precisely localize, etc.) and optionally any number of features within a route (e.g., predetermined route, potential route, etc.) of the autonomous agent, such as any or all of: road infrastructure (e.g., intersections, stop signs, lane markings, streets, etc.); pedestrians; other vehicles (e.g., vehicles proximal the autonomous agent) or modes of transportation (e.g., bicycles, scooters, etc.); and/or any other suitable information.

In a second set of variations of the set of infrastructure devices, each infrastructure device includes a set of one or more LiDAR sensors, which can function to determine a precise, 3-dimensional localization of an autonomous agent. In specific examples, the LiDAR sensors of the infrastructure device can function to know an autonomous agent's position with greater position than the autonomous agent itself.

Additionally, or alternatively, other infrastructure devices 120 may include traffic management devices or the like operating in the environment that may function to communicate with one or more of the roadside units and/or communicate directly with the autonomous agent regarding data collected and/or sensed by the infrastructure device, regarding an operating state of the infrastructure device (e.g., red or green traffic light), and the like. For example, in the case that the autonomous agent 110 is an autonomous vehicle, a traffic light may be an infrastructure device in an environment surrounding the autonomous vehicle that may function to communicate directly to the autonomous vehicle or to a roadside unit that may be in operable communication with the autonomous vehicle. In this example, the traffic light may function to share and/or communicate operating state information, such as a light color that the traffic light is projecting, or other information, such as a timing of the light changes by the traffic light, and/or the like.

The communication interface 130 preferably enables the autonomous agent 110 to communicate and/or exchange data with systems or devices external to the autonomous agent 110. Preferably, the communication interface 130 enables one or more infrastructure devices 120 to communicate directly with the autonomous agent 110. The communication interface 130 preferably includes one or more of a cellular system (or any suitable long-range communication system), direct short-wave radio, or any other suitable short-range communication system. Additionally, or alternatively, the communication interface 130 may function to enable inter-vehicle communication between the autonomous agent no and other vehicles, including fully autonomous vehicles, semi-autonomous vehicles, and manual vehicles.

In some embodiments, in addition to a powertrain (or other movement-enabling mechanism), autonomous agent no may include a sensor suite (e.g., computer vision system, LiDAR, radar, wheel speed sensors, GPS, cameras, etc.) or onboard sensors that are in operable communication with the onboard computing system 115.

The sensor suite preferably includes sensors used to perform autonomous agent operations (such as autonomous driving) and data capture regarding the circumstances surrounding the autonomous agent no as well as data capture relating to operations of the autonomous agent no but may additionally or alternatively include sensors dedicated to detecting maintenance needs of the autonomous agent 110. For example, the sensor suite may include engine diagnostic sensors or an exterior pressure sensor strip. As another example, the sensor suite may include sensors dedicated to identifying maintenance needs related to cleanliness of autonomous agent interiors; for example, internal cameras, ammonia sensors, methane sensors, alcohol vapor sensors, etc.

In preferred variations, the sensor suite of the autonomous agent includes multiple types of sensors, such as, but not limited to, any or all of: cameras, LiDAR sensors, radar sensors, and GPS sensors.

Any or all of the sensors of the sensor suite can be placed onboard the autonomous agent (e.g., on an external surface, on an internal surface, etc.); offboard the autonomous agent (e.g., arranged remotely, as part of a secondary device such as a mobile device, etc.); and/or at any combination of the two.

In some variations, at least a subset of sensors (e.g., cameras, LiDAR sensors, radar sensors, etc.) are mounted to an exterior surface of an autonomous agent vehicle (e.g., doors, bumper, roof, windows, windshield, etc.). Additionally or alternatively, at least a subset of sensors, which can include the same type of sensors and/or different sensors as those described above for being mounted to an external surface of the autonomous agent vehicle (e.g., mounted to the vehicle's frame, attached to a windshield/roof/other surface, etc.), are mounted to an interior surface of the autonomous agent (e.g., inside of doors, seats, ceiling, floor, windshield, etc.). In specific examples, for instance, multiple sensors are arranged at numerous locations on the exterior and within the interior of the vehicle such that the sensors are able to capture a desired region. The desired region can be defined by, but not limited, any or all of: a desired field-of-view (e.g., a desired predetermined portion of a route, a 360-degree field-of-view, a vertical field-of-view such as a height above ground that the sensors can capture, etc.); a desired capture (e.g., in terms of resolution) of one or features along a route (e.g., intersections, particularly risky locations, pedestrians, road markings, unexpected features such as an accident or construction site, etc.); a desired capture of one or more infrastructure devices (e.g., a range of heights that the sensors must capture); a predetermined geometric region; and/or any other suitable regions. It should be noted that in addition or alternative to a visual field-of-view, "field-of-view" can equivalently refer to the range captured by one or more radar sensors, the range captured by one or more LiDAR sensors, and/or any other suitable ranges captured by any suitable sensors.

In some variations, especially for instances in which the autonomous agent vehicle is used to transport one or more passengers (e.g., an autonomous shuttle, an autonomous personal use vehicle, an autonomous ride share vehicle, etc.), the set of potential calibration errors can include disturbances occurring in the routine use of a vehicle. These can include any or all of: repeated closing and opening of doors (e.g., driver door, passenger door, etc.); repeated closing and opening of a trunk; cleaning of the vehicle (e.g., cleaning a windshield, carwash of the external surfaces, cleaning/vacuuming of the interior, etc.); bumping of interior sensors; minor collisions; and/or any other perturbations. Additionally or alternatively, the set of potential calibration errors can include normal wear-and-tear and/or exposure to the environment (e.g., sun, rain, wind, etc.).

In a set of specific examples, at least a set of cameras are arranged at an interior and an exterior of a vehicle, and optionally one or both of a set of LiDAR sensors and a set of radar sensors are further arranged at at least the exterior of the vehicle and optionally the interior, such that the sensors are able to capture a large range of the surroundings of the vehicle (e.g., 360-degree field-of-view with vertical height able to capture all infrastructure devices along route).

In accordance with one or more embodiments, an autonomous operating system may generally include a controller 116 that controls autonomous operations and/or actions of the autonomous agent 110, as shown by way of example in FIG. 2. That is, suitable software and/or hardware components of controller 116 (e.g., processor and computer-readable storage device) are utilized to generate control signals for controlling the autonomous agent 110 according to a routing goal of the autonomous agent no and selected behavioral policies of the autonomous agent.

Additionally, or alternatively, the autonomous agent no includes a sensor fusion system 117, a positioning system 118, and a guidance system 119. As can be appreciated, in various embodiments, the instructions may be organized into any number of systems (e.g., combined, further partitioned, etc.) as the disclosure is not limited to the present examples.

In various embodiments, the sensor fusion system 117 synthesizes and processes sensor data and predicts the presence, location, classification, and/or path of objects and features of the environment of the autonomous agent 110. In various embodiments, the sensor fusion system 117 may function to incorporate data from multiple sensors and/or data source, including but not limited to cameras, LiDARs, radars, infrastructure devices, remote data feeds (Internet-based data feeds), and/or any number of other types of sensors.

The positioning system 118 preferably processes sensor data along with other data to determine a position (e.g., a local position relative to a map, an exact position relative to lane of a road, vehicle heading, velocity, etc.) of the autonomous agent 110 relative to the environment. The guidance system 119 processes sensor data along with other data to determine a path for the vehicle 110 to follow.

In various embodiments, the controller 116 may function to implement machine learning techniques to assist the functionality of the controller 116, such as feature detection/classification, obstruction mitigation, route traversal, mapping, sensor integration, ground-truth determination, and the like.

The plurality of autonomous health monitors preferably function to evaluate data streams from any data source associated with an operation and/or control of an autonomous agent no and output autonomous health intelligence data. In one embodiment, autonomous health intelligence data may relate to a judgement by each of the autonomous health monitors regarding a state of health of each of the devices and/or operations that produce the data streams. In one embodiment, each of the plurality of autonomous health monitors may be configured to evaluate a different data stream originating from different data sources. For instance, a first data stream from a first device may be evaluated by a first autonomous health monitor and a second data stream from a second process or operation may be evaluated by a second autonomous health monitor and the like.

Each of the plurality of autonomous health monitors may be in operable communication with the autonomous state machine. The autonomous state machine preferably functions to consume the autonomous health intelligence data as well as state data from any suitable source (e.g., from the plurality of autonomous control planning modules 410 or the like). In a preferred embodiment, the autonomous state machine may be a device that is separate and distinct from the onboard computer 115 and may function to calculate an operating state or a level of operability (e.g., runlevel) of an autonomous agent based on inputs of health data. The operating state and/or the level of operability preferably includes a value that indicates an extent to which the capabilities and/or functionalities of autonomous agent are operable or not operable (e.g., runlevel 7=100% operability, runlevel 6=90% operability, and/or the like). While it may be generally described that a given level of operability may be associated with a percentage level of operability of an autonomous agent, it shall be noted that a level of operability shall not be restricted to such example, but may additionally or alternatively include embodiments in which a health system (e.g., health monitors) of the autonomous agent evaluates capabilities and/or operability of the autonomous agent's systems, and identifies a level of operability based on this evaluation.

It shall be noted that while the autonomous state machine may be implemented independently of an onboard computer 115 of an autonomous agent 110, the autonomous state machine may be integrated with any suitable device and/or system of an autonomous agent 110 including the onboard computer 115.

The plurality of autonomous control planning modules 410 preferably function to generate a plurality of autonomous control instructions for an autonomous agent 110. Accordingly, each of the plurality of autonomous control planning modules 410 may function to output different autonomous control instructions or plans that correspond to different level of operability of an autonomous agent.

Additionally, each of the plurality of autonomous control planning modules 410 may be configured to continuously collect data streams from a plurality of data sources (e.g., onboard and offboard data sources) and run in parallel to continuously simulate one or more trajectory outcomes for an autonomous agent 110 and correspondingly, generate autonomous control instructions based on a simulation having a highest probability of occurring, as described in U.S. Provisional Application No. 62/701,014, which is incorporated by this reference in its entirety.

2. Method for Intelligently Calibrating Infrastructure Devices Using Infrastructure Device Data and Autonomous Agent Data As shown in FIG. 5, a method 200 for intelligently calibrating infrastructure (sensing) devices (e.g., sensors, infrastructure devices, etc.) using onboard sensors of an autonomous agent includes identifying a state of calibration of an infrastructure device S205, collecting observation data from one or more data sources, S210, identifying or selecting mutually optimal observation data S220, specifically localizing a subject autonomous agent based on granular mutually optimal observation data S230, identifying dissonance in observation data from a perspective of a subject infrastructure device S240, and recalibrating a subject infrastructure device S250.

At least a portion of the method 200 is preferably performed continuously throughout the traversal of a route by an autonomous agent, such as at any or all of: a predetermined frequency, a random set of intervals, and/or at any other suitable times. Additionally or alternatively, any or all of the method 200 can be performed in response to a trigger (e.g., a time elapsed since last calibration update, an input from a user, a detected state of calibration or uncalibration in S205, an error in driving such as an accident, a manual takeover of the vehicle, etc.), once per route traversal, greater than once per route traversal, and/or at any other suitable time(s).

The method 200 can additionally or alternatively include any or all of the methods, processes, and/or embodiments described in any or all of: U.S. patent application Ser. No. 16/514,624, filed 17 Jul. 2019, U.S. patent application Ser. No. 16/505,372, filed 8 Jul. 2019, and U.S. patent application Ser. No. 16/540,836, filed 14 Aug. 2019, each of which is incorporated herein in its entirety by this reference.

Figure 3:
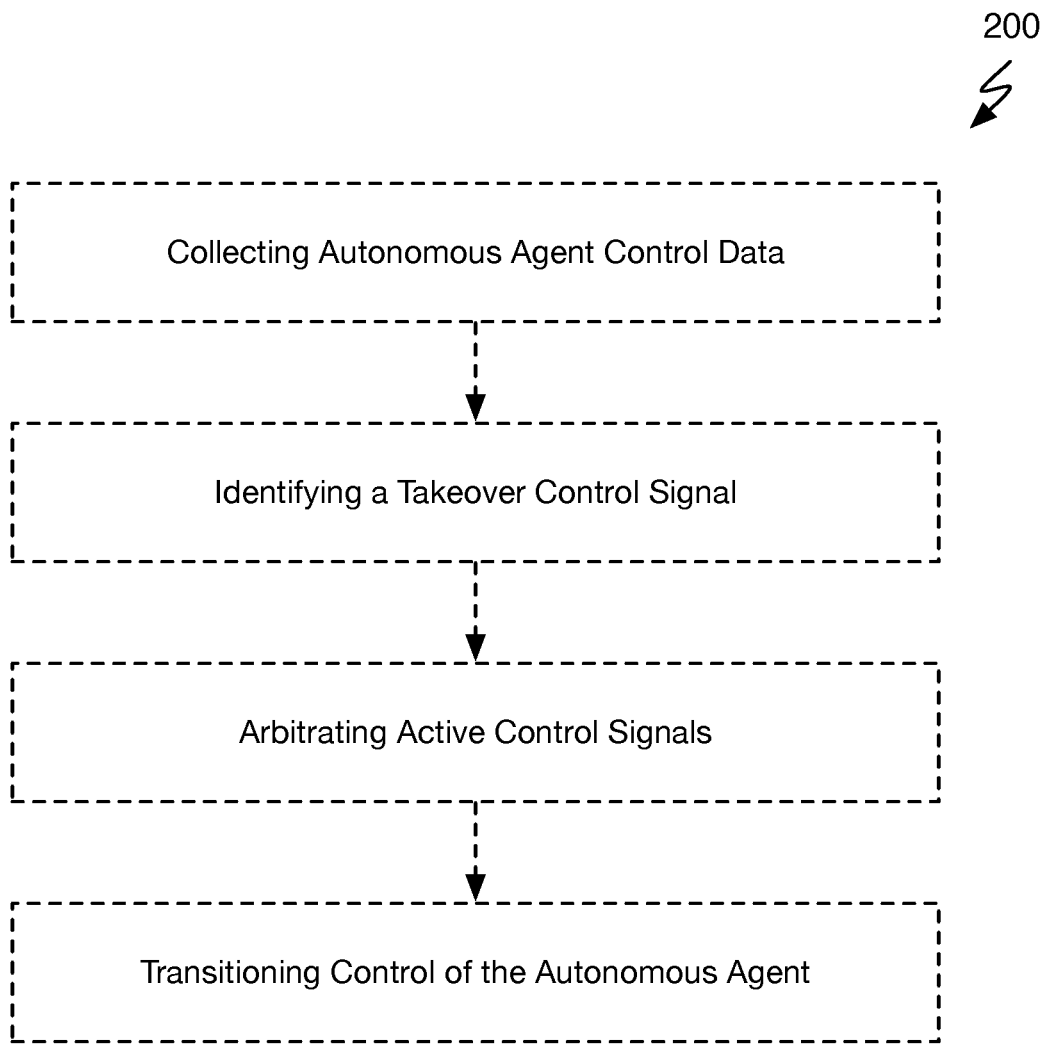
FIG. 3 illustrates an example method in accordance with one or more embodiments of the present application.

In some variations for instance (e.g., as shown in FIG. 3), the method 200 can additionally include and/or interface with a method including any or all of: collecting autonomous agent control data; identifying a takeover control signal; arbitrating active control signals; and transitioning control of the autonomous agent. Additionally or alternatively, the method 200 can include any other suitable processes.

2.05 State of Calibration

The method can optionally include S205, which includes identifying a state of calibration of an infrastructure device, may function to identify a calibration status of an infrastructure device arranged in an operating environment of an autonomous agent. The calibration status preferably includes calibration status data indicating whether a subject infrastructure device is accurately calibrated or inaccurately calibrated. Additionally, or alternatively, the calibration status data may include data indicating that a calibration status of a subject infrastructure device is unknown, indeterminable, and/or the like.

In the circumstances in which calibration status data indicates that a subject infrastructure device may be uncalibrated, the calibration status data may additionally or alternatively indicate a (un)calibration status type. That is, in addition to an indication that the subject infrastructure device is uncalibrated, the calibration status data obtained from the subject infrastructure device may include additional metadata relating to one or more a plurality of distinct types of uncalibration and/or one or more of a plurality of distinct error codes relating to a malfunction or uncalibration of the subject infrastructure device.

For instance, a first type of uncalibration may relate to one or more types of extrinsic calibration errors, shifts, drift, and/or the like of an infrastructure device. In one example, an extrinsic uncalibration may relate to a physical characteristic of an infrastructure device that may be uncalibrated. In such example, a physical position and/or orientation of one or more physical features of the infrastructure device may be uncalibrated; meaning that the physical feature has shifted from a first state of calibration and/or position to a second state of uncalibration and/or position. In some variations, for instance, the position of an infrastructure device on a utility pole (e.g., telephone pole) can be moved/bumped by a worker doing maintenance for other objects (e.g., electrical lines) associated with the infrastructure.

For variations of the infrastructure device including LiDAR sensors and/or any other sensors with a mechanical component that spins over time, a calibration error in the form of drift can occur due to spinning over time.

Accordingly, an extrinsic uncalibration of an infrastructure device can be an uncalibration type that may be perceivable by an inspection (e.g., by viewing, etc.) and/or evaluation of the external characteristics of a subject infrastructure device. However, it shall be noted that an extrinsic uncalibration may relate to any type of uncalibration of or relating to a hardware component of an infrastructure device.

In another instance, a second type of uncalibration may relate to one or more types of intrinsic calibration errors, shifts, and/or the like of an infrastructure device. In one example, an intrinsic uncalibration may relate to an unexpected or unintended change(s) in the calibration of one or more internal physical and/or software features of an infrastructure device. In one example, if an infrastructure (sensing) device comprises a camera, an intrinsic uncalibration may relate to an unexpected shift or change in a focal length of the camera. In another example, if an infrastructure device comprises a microwave sensor, an intrinsic uncalibration may relate to one or more software glitches that may affect the microwaves ability to properly compute or detect movement and/or compute a precise location of movement, etc.

Uncalibration of an infrastructure device may be caused by a variety and/or combination of events or elements including, but not limited to, tampering, physical degradation caused by environmental factors (e.g., nature, climate, etc.), defect(s) in characteristics of an infrastructure device, drift over time, accidents, and/or the like. It shall be recognized that the above-noted are merely examples and the types and/or causes of uncalibration of an infrastructure device causes of uncalibration and/or calibration errors in infrastructure devices shall not be limited thereto.

In some implementations, a calibration status may be obtained or identified based on health status data that is self-generated by an infrastructure device in a normal course of operation of the infrastructure device. For instance, an infrastructure device may function to continuously and/or periodically provide (generate) health status data that includes calibration status data. Additionally, or alternatively, health status data may be actively requested, or the generation of health status data may be triggered by one or more parties and/or other devices (e.g., an autonomous agent, another infrastructure device, a remote-control terminal, etc.) that is in operable communication with the subject infrastructure device.

In a preferred implementation, a calibration status may be obtained and/or identified according to one or more steps (e.g., S210-S240) of the methods and/or processes described herein.

In additional or alternative implementations, a calibration status is determined prior to the remaining processes of the method, wherein the result of the calibration status is either used to trigger any or all of the remaining processes (e.g., in an event that the calibration status indicates proper calibration) or prevent any or all of the remaining processes (e.g., in an event that the calibration status indicates improper calibration).

2.1 Obtaining/Receiving Infrastructure and/or Autonomous Agent Data

The method includes S210, which includes collecting observation data from one or more data sources, functions to collect streams of observation data from one or more data sources including one or infrastructure devices and one or more autonomous agents that may enable a detection of an uncalibrated infrastructure device and a generation of calibration parameters. Generally, the collected data may include observation data, infrastructure device data (also referred to herein as "infrastructure data"), and/or autonomous agent data (sometimes referred to herein as "agent data"). Observation data may generally relate to data observed by and/or sensed by either or both of an infrastructure device and an autonomous agent. Infrastructure data may generally relate to data sourced from an infrastructure device that may include observation data. Autonomous agent data may generally relate to data sourced from an autonomous agent that may include observation data.

S210 is preferably performed continuously (e.g., at a predetermined frequency) throughout the method 200, but can additionally or alternatively be performed in response to S205, in place of S205, in absence of S205, in response to a trigger, once during the method 200, and/or at any other suitable times. Further additionally or alternatively, the method 200 can be performed in absence of S210.

In a preferred embodiment, the one or more data sources may include devices and/or systems of an autonomous agent, sensors mounted (e.g., onboard sensors) on the autonomous agent, processes performed by or involving the autonomous agent, and infrastructure devices in a proximity of the autonomous agent. In one or more embodiments, data sourced from an autonomous agent (i.e., autonomous agent data) preferably includes precise location (e.g., GPS data over time and/or the like) and agent model data that may include data that identifies the autonomous agent and that may also, identify physical features and/or attributes of the autonomous agent (e.g., an appearance of the autonomous agent). In a preferred embodiment, agent model data includes an expected model of the autonomous agent. The data collected in S210 may additionally or alternatively include one or more health status data, which may include any or all of: operational status data, diagnostic information, resource utilization information, observational data (preferably collected from an environment or circumstances surrounding a given infrastructure device or autonomous agent), temporal information (e.g., time since last calibration update), and/or any other suitable information. The health status data may preferably include current or prior calibration data of one or more sensors or of an infrastructure device together with positional data, such as a two or three-dimensional coordinate position (e.g., [x,y,z] position) that identifies a geographical position of an infrastructure device or autonomous agent.

Additionally, or alternatively, the infrastructure data and the autonomous agent data may be collected and provided as input into a shared compute resource, such as a calibration module and/or calibration circuit that determines a state of calibration and that may also generate calibration parameters that enable a correction or remediation of a state of uncalibration of an infrastructure device or the like, as shown by way of example in FIG. 4. The calibration module and/or calibration circuit may be deployed in any suitable many, including via a remote distributed computing system (e.g., the cloud), on a subject autonomous agent, and/or at an infrastructure device.

It shall be noted that while the one or more data sources preferably include devices and/or systems of the autonomous agent, onboard sensors (e.g., a sensor suite), and infrastructure devices (e.g., receiving health statuses and observation data from offboard devices, such as roadside units), the one or more data sources may additionally or alternatively include one or more remote data feeds (e.g., weather feed, traffic feed, etc.), a remote autonomous agent platform (e.g., remote servers, cloud servers, etc. for remotely managing and/or operating an autonomous agent), other autonomous agents, and any other suitable data sources involved with or relating to an operation of an autonomous agent and/or one or more infrastructure devices.

In one preferred embodiment, S210 may function to collect streams of data from one or more onboard devices and/or onboard processes associated with an autonomous agent. For example, one or more onboard devices may include one or more onboard sensor devices that may function to capture and/or sense data regarding an environment or circumstances surrounding an autonomous agent. Additionally, or alternatively, the one or more onboard devices may function to capture and/or sense data relating to an operation of one or more low-level devices (e.g., actuators, actuated devices, etc.), operating systems (e.g., onboard computing system, controller, sensor fusion system, positioning system, guidance system, communication interface, and the like), etc.

In one preferred embodiment, S210 may function to collect streams of data from infrastructure devices. In such preferred embodiment, S210 functions to collect the streams of data during an operation of the autonomous agent but may also function to collect the streams of data during periods in which the autonomous agent is not in an active state (e.g., parked or the like). The infrastructure devices preferably include one or more sensor devices that are intelligently arranged and/or positioned within an (operating or driving) environment of an autonomous agent. For instance, the one or more sensor devices may be arranged to observe and/or collect data that may be assistive for determining and/or generating driving/operating (control) instructions for an autonomous agent and also, for decisioning by an autonomous agent when presented with multiple driving and/or operating instructions which instructions to execute and which instructions to disregard. Thus, the one or more infrastructure sensors may function to collect data in a driving environment, which may include road data, sidewalk data, short-range communication data (e.g., radio communication links, etc.), positions of static and/or dynamic object data (e.g., agent data), traffic data, and the like along a given route plan or a possible route plan of a given autonomous agent.

In some embodiments, the infrastructure devices may include one or more sensor devices that are fixedly attached or positioned within an (driving) environment, such that a fixed (or substantially) coordinate location of the one or more sensor devices may be known when properly calibrated. Accordingly, such fixedly arranged infrastructure devices may have a fixed field-of-detection. For instance, a camera fixed in a driving environment may have a fixed field-of-view. In some embodiments, the infrastructure devices may include one or more sensors devices that are movably positioned within an environment, such that a coordinate location of the one or more sensor devices or physical features of the one or more sensor devices varies. In such embodiments, the infrastructure devices may have a variable field-of-detection and may be capable of sensing data along multiple trajectories within an environment.

In a first implementation, S210 may function to automatically collect streams of data from one or more infrastructure devices that are in communication proximity (e.g., within a predetermined distance threshold or a field-of-detection, etc.) of the autonomous agent. In some embodiments, the infrastructure devices may be configured to communicate with an autonomous agent using short-ranged communication schemes or systems. In such embodiments, once the autonomous agent has entered a communication range or proximity of a given infrastructure device, the autonomous agent may function to automatically detect signals from the infrastructure device and automatically collect data originating from the infrastructure device.

In a second implementation, S210 may function to automatically collect streams of data from one or more infrastructure devices that are a predetermined distance from an operating autonomous agent. That is, in some embodiments, an operating environment of an autonomous agent may include a plurality of infrastructure devices, however, the autonomous agent may be configured to automatically collect data from only a subset of the plurality of infrastructure device within the predetermined distance of the autonomous agent and possibly, ignore data incoming from other infrastructure devices outside of the predetermined distance of the autonomous agent. In this way, the autonomous agent may function to collect data having a more immediate or higher relative importance for pending and/or immediate operating decisions.

In a variant of the second implementation, S210 may function to automatically collect streams of data from one or more infrastructure devices that are a predetermined distance of the autonomous agent and weigh or consider data collected from the one or more infrastructure devices within an active trajectory or travel path of the autonomous agent differently than data from infrastructure devices that are not or no longer within a trajectory or travel path of the autonomous agent. That is, in some embodiments, S210 may function to aggregate and weigh data from infrastructure devices that are substantially coincident with a position of the autonomous agent and ahead of a travel path of the autonomous agent with additional weight than a weight afforded to data from infrastructure devices behind or that has been passed by the autonomous agent along its travel path.

In some embodiments, the data collected from the one or more infrastructure devices may include compressed and/or semantically dense data regarding one or more features of an environment. In some embodiments, the field-of-detection of given infrastructure device comprises a geometrically defined region and within the geometrically defined region, the infrastructure device may be configured to sense or collect a semantic abstraction (e.g., a general shape or size, positions, velocity (moving or not moving) of the features, objects, and/or agents within the geometrically defined region.

Additionally, or alternatively, in some embodiments, the one or more infrastructure devices may be configured to sense or detect data within the geometrically defined region and derive and/or compute a state data about the circumstances within the geometrically defined shape. For instance, if the geometrically-defined shape or sensing region is a square that includes a sidewalk or similar pedestrian path, a first infrastructure sensor device may function to identify whether there are motionless agents (objects or persons that are not moving) and/or moving agents (objects or persons that are moving) on the sidewalk and provide as state data to the autonomous agent an indication confirming motionless agents or moving agents positioned on the sidewalk. In one or more instances in the present application, motionless agents may sometimes be referred to herein as static agents thereby identifying an agent (object or person) that is not moving within a sensed region or scene. Also, in one or more instances in the present application, moving agents may sometimes be referred to herein as dynamic agents thereby identifying an agent that is moving within a sensed region or scene.

In some cases, if there are no agents positioned within the geometrically-defined sensing region, the state data may be an indication of no agents (e.g., "Clear"). Thus, in such embodiments, rather than sending a full representation of a scene within the geometrically-defined shape or sensing region, the infrastructure device may provide semantically dense state data to an autonomous agent. As a few examples of state data, the infrastructure sensing devices may indicate Agent or No Agent, Static Agent or Dynamic Agent, Clear or Not Clear, Busy (Active) or Not Busy (Not Active), and/or any suitable simplified and/or derivative information about circumstances within a sensing region of an infrastructure device that may be provided to an autonomous agent.

2.2 Coarse Observation Selection

The method includes S220, which includes identifying or selecting mutually optimal observation data, functions to make a coarse identification of observation data that preferably includes coincidence between infrastructure data of a subject infrastructure device and autonomous agent data of a subject autonomous agent. In a preferred embodiment, S220 may function to jointly evaluate infrastructure data and autonomous agent data to coarsely identify segments of infrastructure data and segments of autonomous agent data in which the subject infrastructure device and the subject autonomous agent may have mutually observed each other (via sensors and/or the like) during a normal course of operation. That is, S220 may function to determine one or more instances in which it was probable or likely a subject autonomous agent may have observed a subject infrastructure device and at a same time or period, the subject infrastructure device may have observed the subject autonomous agent. Accordingly, S220 enables a coarse localization of a subject autonomous agent as well as a subject infrastructure device within the mutually optimal observation data.

S220 is preferably performed continuously (e.g., at a predetermined frequency) throughout the method 200, but can additionally or alternatively be performed in response to S210, in place of any or all of the above processes, in absence of any or all of the above processes, in response to a trigger, once during the method 200, and/or at any other suitable times. Further additionally or alternatively, the method 200 can be performed in absence of S220.

In a first implementation, S220 preferably functions to identify coarse segments (of mutually optimal observation data) of coincidence between infrastructure data and autonomous agent data based on synchronizing timestamp data obtained from both of the infrastructure data and the autonomous agent data. Additionally, or alternatively, S220 may function to define the coarse segments of coincidence based on trajectory data and/or position data (preferably timestamped) of the autonomous agent that is preferably extracted from the autonomous agent data. The trajectory data, in some embodiments, may include a predetermined trajectory or route plan of a subject autonomous agent, which may have been identified from autonomous agent data. The trajectory data may additionally include expected position data, which may also include expected time data for each identified expected position of the subject autonomous agent along the trajectory or route plan and expected times at which the subject autonomous agent should arrive at each expected position along the trajectory. Additionally, or alternatively, the trajectory data may include an actual or historical travel path taken by a subject autonomous agent, which includes position data along with time data for each position of the autonomous agent along the travel path.

In a second implementation, S220 may function to identify coarse segments of coincidence between infrastructure data and autonomous agent data based on correlating position data of a subject autonomous agent to a field-of-detection of a subject infrastructure device. Preferably, in this second implementation, S220 functions to identify one or more segments of the infrastructure data in which the subject autonomous agent should have been found or positioned within a field-of-detection of the infrastructure device based on the position data and timestamp data of the subject autonomous agent. In this way, S230 may function to coarsely localize the autonomous agent at least within the field-of-detection of the subject infrastructure device.

2.3 Observation Data Reduction & Granular Localization

The method can optionally include S230, which includes specifically localizing a subject autonomous agent based on granular mutually optimal observation data, may function to identify one or more granular instances of coincidence between infrastructure data and autonomous agent data in which a subject autonomous agent and a subject infrastructure device were most likely mutually observable and further, may function to precisely localize the autonomous agent within the field-of-sensing of the infrastructure device based on the mutually optimal observation data. That is, in one preferred embodiment, S230 may function to specifically localize or identify one or more instances of a subject autonomous agent within the observation data obtained from a subject infrastructure device at the one or more instances in which it was determined with high probability (e.g., beyond a localization threshold) that the subject autonomous agent and the subject infrastructure device may have been observing each other.

S230 is preferably performed continuously (e.g., at a predetermined frequency) throughout the method 200, but can additionally or alternatively be performed in response to S220, in place of any or all of the above processes, in absence of any or all of the above processes, in response to a trigger, once during the method 200, and/or at any other suitable times. Further additionally or alternatively, the method 200 can be performed in absence of S230.

Accordingly, granular mutually observation data preferably relates to observation data in which a subject autonomous agent has been specifically identified or precisely localized from a sensing (observing) perspective of a subject infrastructure device. In one preferred embodiment, S230 may function to achieve granular observation data by reducing coarse observation data (as generated in S220) to eliminate noise or extraneous data to enhance a search capability and/or localization of the subject autonomous agent. That is, S230 may function to extract from coarse mutually observation data a subset of observation data comprising granular mutually observation data by paring away extraneous data. For instance, coarse mutually observation data (CMOD) reduced by extraneous data should result in granular mutual observation data (GMOD) (i.e., CMOD−Extraneous Data=GMOD).

Accordingly, in some embodiments, S230 may function to pare away and/or reduce from the coarse observation data extraneous data that may not positively enable a localization and/or identification of a subject autonomous agent within infrastructure data obtained from a subject infrastructure device. For instance, based on autonomous agent data that may include a model of the autonomous agent, such as a schematic representation, an image, illustration, and/or any suitable representation of the autonomous agent, S230 may function to pare away or reduce any other autonomous agents, other vehicles, and/or any other object from the observation data (typically from the infrastructure data) that does not include the given model of the autonomous agent. In another example, if observation data (sourced from the autonomous agent) indicates that the subject autonomous agent was dynamic and/or a moving object during a period or instance of mutual observation, S230 may function to pare or reduce from the observation data (sourced from the infrastructure device) the data relating to static objects. In this way, once the coarse observation data is pared down to granular observation data (i.e., data without extraneous data), the method 200 may efficiently operate on and/or process the granular observation data to identify and/or localize the subject autonomous data and determine whether calibration of a subject infrastructure device is required.

Additionally, or optionally, the method 200 may function to pare down or reduce observation data including raw infrastructure data and raw autonomous agent data and/or the like ahead of performing S220. In this way, S220 and S230 may not have to perform analysis of super extraneous observation data either obtained from the infrastructure sensing devices and/or the autonomous agent. For instance, if the method 200 involves calibrating an autonomous agent which was not operating during a specific window of time or period, the method 200 may function to eliminate or pare away infrastructure sensing data captured during that period of time prior to performing an analysis of the observation data. Accordingly, super extraneous data preferably relates to observation data in which the probability that a subset of the observation data is useful or can be used to identify an autonomous agent or identify an infrastructure device within the observation data for purposes of calibrating either the autonomous agent or the infrastructure device is below or does not satisfy a calibration data threshold. Accordingly, any suitable data point from observation data may be used to determine a probability or likelihood that a subset of observation data is super extraneous data and therefore, should not be considered and/or eliminated from the observation data prior to performing one or more analysis or processes of S220 and S230.

In a first implementation, once coarse mutual observation data is pared down to granular mutual observation data, S230 may function to specifically localize the subject autonomous agent within the infrastructure data of a subject infrastructure device based on evaluating a given agent model of the subject of the autonomous agent. In a preferred embodiment, agent model data may be obtained from autonomous agent data and S230 preferably functions to use the agent model data to perform a search within the granular mutual observation data for the subject autonomous agent within a specific period or temporal window in which it is known or has been determined (as in S220) that the subject autonomous agent may be positioned within a field-of-sensing or field-of-observation of a subject infrastructure device.

In this first implementation, S230 may function to perform a feature matching based on the agent model data. In such implementation, S230 may function to use agent model data to compute an alignment between observed features (preferably, within the granular mutual observation data) and expected features of the subject autonomous agent and thereby, estimate a position of the subject autonomous agent from the perspective of the subject infrastructure device. The feature data may include physical features of the autonomous agent, determined at a time of manufacture of the autonomous agent. Additionally, or alternatively, the feature data may include one or more uniquely identifying physical features (e.g., a marker, a tag, emblems, etc.) augmented to the autonomous agent data post-manufacture of the autonomous agent. As an example, a localization circuit or the like may function to perform a search in a local geographic region from a view point of a subject autonomous agent (and/or the infrastructure device) for data that matches an expected model and/or feature data of the autonomous agent.

2.4 Dissonance Identification/Calibration Error Detection

The method can include S240, which includes identifying dissonance in observation data from a perspective of a subject infrastructure device, may function to identify instances in which there is a difference between observed data (or actual observation data) of the subject infrastructure device and expected observation data. Specifically, in some embodiments, S240 may function to identify or detect when the observed data relating to an observation of a subject autonomous agent does not match or may be misaligned with expected observation data of the subject autonomous agent.

S240 is preferably performed in response to S230, but can additionally or alternatively be performed continuously throughout the method 200, in place of any or all of the above processes, in absence of any or all of the above processes, in response to a trigger, once during the method 200, and/or at any other suitable times. Further additionally or alternatively, the method 200 can be performed in absence of S240 (e.g., upon determining that there is no dissonance).

In one embodiment, S240 may function to identify calibration error by computing a mismatch value between the observed data and the expected observation data of the subject autonomous agent. In one implementation, S240 may function to compute a mismatch value based on a calculated (average) distance between one or more features of the subject autonomous agent in the observed data and the same one or more features of the subject autonomous agent in the expected observation data of the autonomous agent. In a variant of this implementation, S240 may function to compute a mismatch value based on a computed difference between an actual position of the autonomous agent as observed by a subject infrastructure device and an expected position of the subject autonomous agent.

Accordingly, S240 may function to determine that calibration error in a subject infrastructure device exists if a calculated mismatch value for the subject infrastructure device satisfies and/or exceeds a (first) calibration error threshold. In some embodiments, the calibration error threshold may be set based on one or more of a type of infrastructure device, a type of calibration error, and/or the like. Additionally, or alternatively, the calibration error threshold may be dynamically adjusted based on environmental factors (e.g., expected shifts in calibration due to environment), prior calibration error in a given infrastructure device (e.g., previously known or detected calibration error), and/or the like. In such embodiments, S240 may function to automatically and/or dynamically adjust a calibration error threshold for a subject infrastructure device based on one or more circumstantial factors specific to a given infrastructure device.

Additionally, or alternatively, in some embodiments, if a computed mismatch value for the subject infrastructure device exceeds a second calibration error threshold that exceeds the first calibration error threshold, S240 may function to automatically trigger a requirement and/or notification for manual intervention and/or recalibration. For instance, in some embodiments, a computed mismatch value may be sufficiently high (i.e., satisfies or exceeds the second calibration error threshold) such that the computed error in or uncalibration of a subject infrastructure device cannot be adequately repaired without manual intervention.

In another embodiment, S240 may function to compute calibration error based on a computed alignment of observed data and expected observation data. In such embodiments, S240 may function to compute calibration correction values based on a forced fit and/or best fit alignment between the observed data and the expected observation data. For instance, S240 may function to bring into alignment an observed data of a subject autonomous agent with expected observation data of the subject autonomous agent. In computing the alignment, S240 may function to translate, rotation, and/or otherwise move data (image data or the like) from the observed data to match the expected observation data. Accordingly, S240 may function to generate calibration correction values based on the amount and/or value for each type of adjustment made to achieve the force fit or best fit between the observed data and the expected observation data of the autonomous agent.

Figure 7:
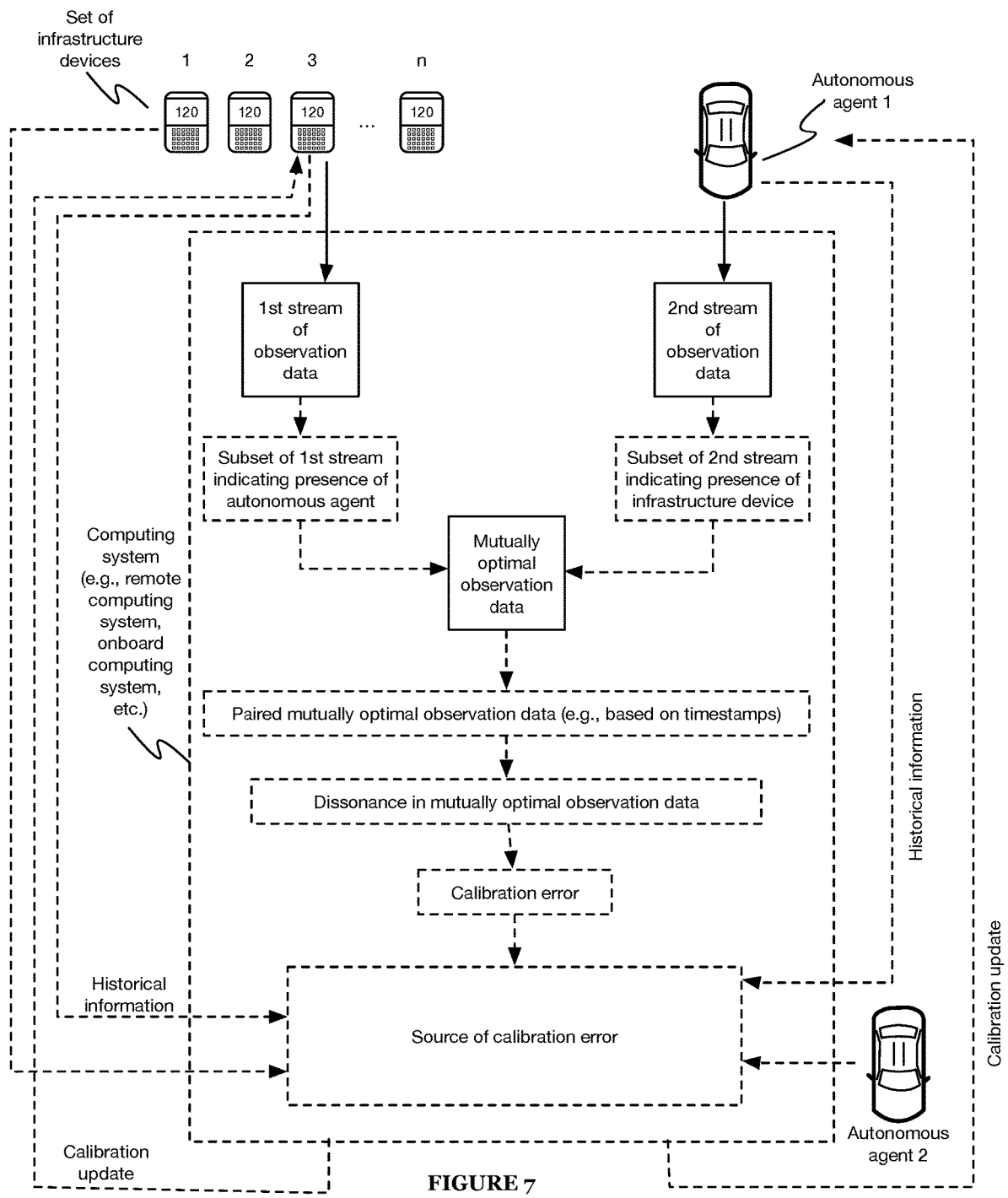
FIG. 7 illustrates a variation of the method 200 performed with a variation of the system 100.

S240 can optionally additionally or alternatively include determining a source of the calibration error (e.g., autonomous agent, infrastructure device, particular sensor of an autonomous agent and/or infrastructure device, etc.) and/or any other features associated with the calibration error (e.g., as shown in FIG. 7), such as, but not limited to: a time at which the calibration error occurred; a cause of the calibration error (e.g., physical bumping of sensor and/or device, sensor drift, environmental wear, etc.); a previous calibration error; a predicted calibration error; and/or any other suitable features.

In some variations, for instance, a source of calibration error can be determined based on aggregated information. The aggregated information can be historical information associated with a particular system component (e.g., autonomous agent, infrastructure device, etc.) and/or particular sensor type (e.g., camera, lidar, radar, etc.) or particular sensor (e.g., right side door camera) of the system component; information aggregated over multiple system components (e.g., multiple autonomous agents, multiple infrastructure devices, etc.) and/or multiple sensors of the same component (e.g., same type of sensor such as multiple cameras, different types of sensors such camera and radar, etc.) and/or multiple sensors of different components (e.g., same sensor type among different autonomous agents, same sensor type among different infrastructure devices, etc.), and/or any other suitable information.

In a first set of specific examples, for instance, S240 includes aggregating information from other infrastructure devices, such that the particular infrastructure device information can be compared with these. If a detected calibration error persists among different infrastructure devices and the same autonomous agent, then it can be determined that the autonomous agent is at least partially responsible for the calibration error.

In a second set of specific examples additional or alternative to those described above, S240 includes aggregating information from other autonomous agents, such that the particular autonomous agent information can be compared with these. If a detected calibration error persists among different autonomous agents and the same infrastructure device, then it can be determined that the infrastructure device is at least partially responsible for the calibration error.

In a third set of specific examples additional or alternative to those described above, S240 can include comparing current data with historical data associated with that component or a separate component. For instance, if a calibration error is detected between a first and second component, and a calibration error was not detected in a previous interaction of the first component (e.g., with a third component), but was detected in a previous interaction of the second component (e.g., with a fourth component), then it can be determined that the calibration error can be at least partially attributed to the second component.

2.5 Recalibration

The method can include S250, which includes recalibrating a subject infrastructure device, may function to generate new calibration parameters (e.g., as shown in FIG. 4) based on a mismatch value(s) and/or a correction value(s) for the subject infrastructure device and communicate the new calibration parameters to the subject infrastructure device. The new calibration parameters preferably comprise a series of parameters computed based on one or more of the mismatch value and/or the correction value that, when applied to a subject infrastructure device, updates a calibration model and/or existing calibration parameters of the subject infrastructure device.

S250 is preferably performed in response to S240, but can additionally or alternatively be performed continuously throughout the method 200, in place of any or all of the above processes, in absence of any or all of the above processes, in response to a trigger, once during the method 200, and/or at any other suitable times. Further additionally or alternatively, the method 200 can be performed in absence of S250 (e.g., upon determining that there is no error in calibration).

In a first implementation, S250 may function to generate new calibration parameters that include a new calibration model for a subject infrastructure device. In this first implementation, S250 may function to transmit the new calibration model to the subject infrastructure device and the subject infrastructure device may function to update it calibration parameters (recalibrate) by replacing a prior calibration model with the new calibration model. In a variant of this first implementation, S250 may function to generate new calibration parameters that may be used to update a prior calibration model rather than replacing the prior calibration model in its entirety.

In a second implementation additional or alternative to the above, S250 may function to generate new calibration parameters that include select calibration parameter values for one or more specific features of the subject infrastructure device. In this second implementation, S250 may function to transmit the select calibration parameter values to the subject infrastructure device and causing the subject infrastructure device to update calibration parameters with the select calibration parameter values. For instance, in some embodiments, a subject infrastructure device may include an articulating sensor for which select calibration parameter values may be generated that may function to recalibrate or adjust one or more position data values, such as a rotational position or movement, an articulation position or path, an angle position or amount, and/or translation position or movement of the articulating sensor. In this same instance, S250 may function to update a physical position of a subject infrastructure device by providing new calibration parameter values for controlling a servo motor or the like that can physically reposition one or more features of the subject infrastructure device.

It shall be noted that the generation of new calibration parameter values may additionally, or alternatively, depend on an infrastructure device type, model, and/or condition.

In a third implementation additional or alternative to those above, S250 can leverage information collected and/or discovered in any or all of the above processes to determine (e.g., generate new, update, select, etc.) calibration parameters based on a knowledge of any or all of: the source of the calibration error (e.g., a particular sensor type, a particular sensor of the infrastructure device, a particular sensor of the autonomous agent, etc.), the cause of the calibration error (e.g., intrinsic calibration error, extrinsic calibration error, etc.), a feature of the calibration error (e.g., magnitude, time at which the calibration error occurred, etc.), and/or any other suitable information.

3.0 Variations

In a first variation of the system 100 (e.g., as shown in FIG. 1, as shown in FIG. 2, etc.), the system includes an autonomous agent 110, wherein the autonomous agent is in the form of an autonomous vehicle; a plurality of infrastructure devices 120, wherein the plurality of infrastructure devices are arranged proximal to a route being traversed or to be traversed by the vehicle. In a specific set of examples, each of the infrastructure devices includes a camera configured to detect the autonomous agent, and optionally additional features, within a region (e.g., wherein the camera lens is chosen based on the size and/or shape of this region), and wherein the autonomous agent includes at least a combination of cameras, radar, and LiDAR sensors. In another set of specific examples, each of the set of infrastructure devices include a set of one or more LiDAR sensors.

Figure 6:
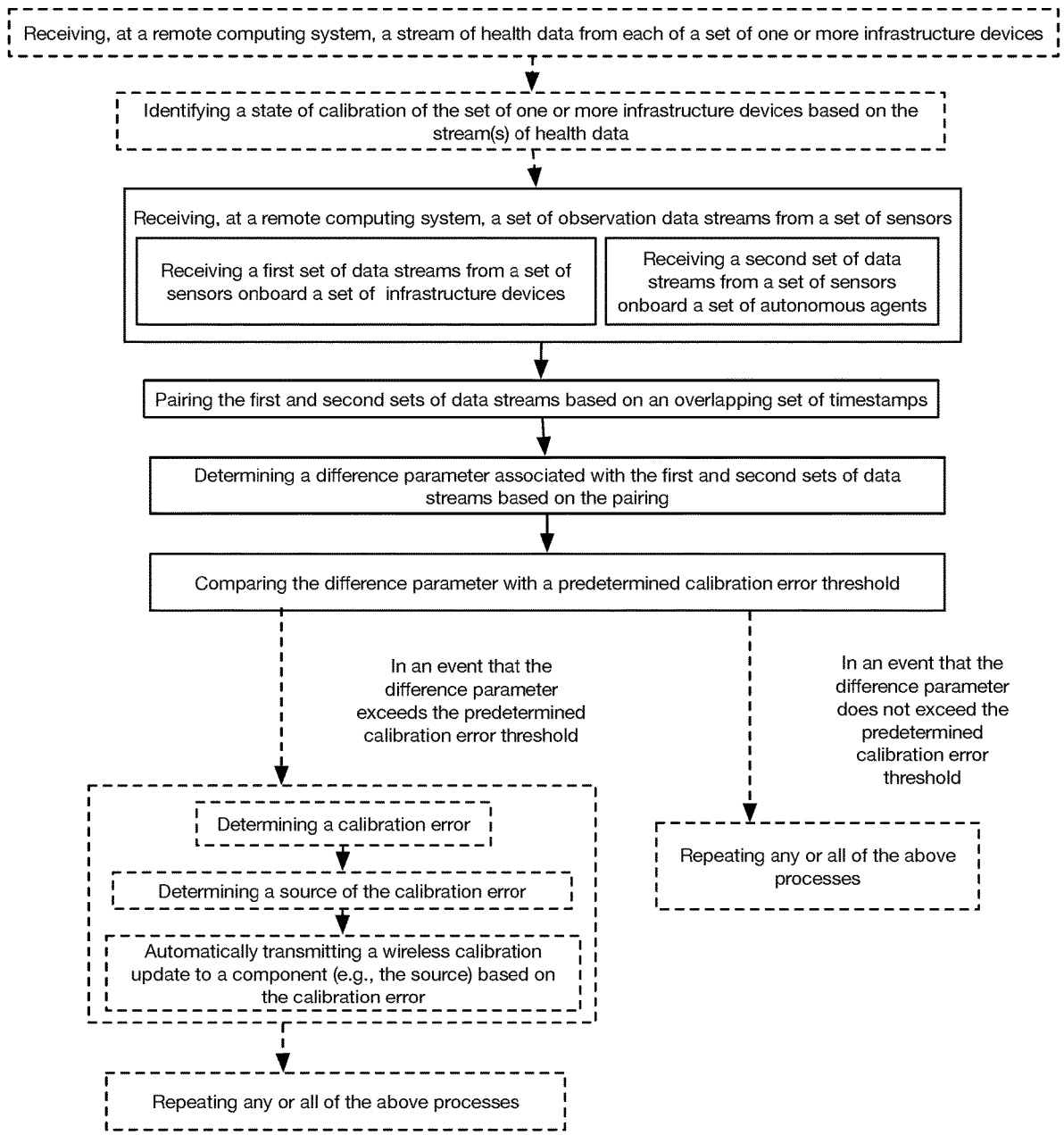
FIG. 6 illustrates an embodiment of the method 200.

In a first variation of the method 200 (e.g., as shown in FIG. 5, as shown in FIG. 6, etc.), the method 200 includes: collecting observation information from a set of one or more data sources S210, wherein observation information including position information is collected from sensors of both the autonomous agent(s) and the infrastructure device(s) along the route of the autonomous agent; identifying and/or selecting mutually optimal observation data S220, wherein selecting the mutually optimal observation data includes pairing data from the autonomous agent and an infrastructure device based on the timestamps associated with the information, and wherein the mutually optimal observation data includes information from the autonomous agent in which the infrastructure device is present (e.g., within a field-of-view of the autonomous agent's sensors) and information from the infrastructure device in which the autonomous agent is present (e.g., within a field-of-view of the infrastructure device's sensors); optionally specifically localizing a subject autonomous agent based on granular mutually optimal observation data S230, wherein the granular mutually optimal observation data is determined by removing noise and/or extraneous information (e.g., information unrelated to the position of the autonomous agent) from the mutually optimal observation data; identifying a dissonance in observation data from a perspective of a subject infrastructure device S240, wherein identifying the dissonance can include identifying a mismatch value in a location parameter (e.g., location of the autonomous agent) and determining that the mismatch value exceeds a predetermined threshold; in the event that the mismatch value exceeds a predetermined threshold, determining that a calibration error has occurred; and in response to determining that the calibration error has occurred, transmitting a calibration update (e.g., recalibration) to a relevant source of the calibration error.

Additionally, the method 200 can include receiving health status information from an infrastructure device and identifying a state of calibration of the infrastructure device based on the health status information. This can be performed prior to any or all of the remaining processes of the method, in place of any or all of the remaining processes (e.g., upon determining that the infrastructure device is properly calibrated, upon determining that the infrastructure device is in need of calibration, etc.), during any or all of the remaining processes of the method, after any or all of the remaining processes of the method, and/or at any other suitable time(s).

Additionally or alternatively, the method 200 can include aggregating information, which can function to determine a source of the calibration error. In specific examples, for instance, any or all of the following information can be compared: current information with historical information (e.g., autonomous agent current information with previous autonomous agent information, infrastructure device current information with previous infrastructure device information, etc.); other device information (e.g., other autonomous agent information, other infrastructure device information, etc.); and/or any other suitable information.

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    receiving a first set of observation data, collected with a sensor onboard an autonomous agent, and a second set of observation data, collected with a secondary device within an environment of the autonomous agent, each of the first and second sets of observation data comprising observations of the environment of the autonomous agent;
    determining an association between the first and second sets of observation data;
    localizing the autonomous agent, in near real-time during a traversal of a route by the autonomous agent, based on the first and second sets of observation data;
    determining a calibration error based on the association and the localization of the autonomous agent;
    updating a state of calibration based on the calibration error; and
    based upon the updated state of calibration, controlling the autonomous agent.

2. The method of claim 1, wherein the association comprises a spatiotemporal association.

3. The method of claim 1, further comprising: determining a source of the calibration error based on a third set of observation data, wherein the state of calibration is updated based on the source of the calibration error.

4. The method of claim 1, further comprising: based on the association, determining mutually optimal observation data for the first and second sets of observation data, wherein the calibration error is determined with the mutually optimal observation data.

5. The method of claim 4, wherein determining the mutually optimal observation data further comprises removing noise from the mutually optimal observation data.

6. The method of claim 1, wherein the association comprises at least one granular instance of coincident mutual observability between the first and second sets of observation data.

7. The method of claim 6, wherein the autonomous agent is localized with joint observation data, from both the first and second sets of observation data, which corresponds to the at least one granular instance of coincident mutual observability.

8. The method of claim 1, further comprising: determining a dissonance between the first and second data sets based on the association, wherein the calibration error is determined using the dissonance.

9. The method of claim 1, wherein updating the state of calibration comprises updating the state of calibration of the sensor.

10. The method of claim 1, wherein updating the state of calibration comprises updating the state of calibration of the secondary device.

11. The method of claim 1, wherein the secondary device is remote from the autonomous agent.

12. The method of claim 11, wherein the secondary device is fixed infrastructure within the environment of the autonomous agent.

13. The method of claim 1, wherein the secondary device comprises a field of sensing, the second set of observation data associated with the field of sensing, wherein the autonomous agent is arranged within the field of sensing.

14. The method of claim 1, further comprising: based on the updated state of calibration, triggering a recalibration routine to update a set of calibration parameters for the sensor or the secondary device.

15. A sensor device comprising a state of calibration and configured to output the state of calibration, the state of calibration determined by:
    determining a first set of observation data with the sensor device;
    determining a second set of observation data with a sensor onboard a vehicle;
    determining an association between the first and second sets of observation data, wherein the first and second sets of observation data each comprise observations of an environment of the vehicle;
    localizing the vehicle, in near real-time during a traversal of a route by the vehicle, based on the first and second sets of observation data;
    determining a calibration error based on the association and the localization of the vehicle;
    determining the state of calibration based on the calibration error; and
    based upon the updated state of calibration, performing at least one of: modifying a behavior of the vehicle, or controlling the vehicle.

16. The sensor device of claim 15, wherein the association comprises a spatiotemporal association.

17. The sensor device of claim 15, wherein the state of calibration is further determined by: determining a source of the calibration error based on a third set of observation data, wherein the state of calibration is updated based on the source of the calibration error.

18. The sensor device of claim 15, wherein the state of calibration is further determined by: based on the association, determining mutually optimal observation data for the first and second sets of observation data, wherein the calibration error is determined with the mutually optimal observation data.

19. A non-transitory computer readable medium comprising software instructions that, when executed by a computing system, cause the computing system to perform:
- determining a first set of observation data, collected with a sensor onboard an autonomous agent, and a second set of observation data, collected with a secondary device within an environment of the autonomous agent, each of the first and second sets of observation data comprising observations of the environment of the autonomous agent;
- determining an association between the first and second sets of observation data;
- localizing the autonomous agent in near real-time during a traversal of a route by the autonomous agent based on the first and second sets of observation data;
- determining a calibration error based on the association and the localization of the autonomous agent;
- updating a state of calibration based on the calibration error; and
- based upon the updated state of calibration, controlling the autonomous agent.

20. The non-transitory computer readable medium of claim 19, wherein the computing system is onboard the autonomous agent.

* * * * *